(12) United States Patent
Oh et al.

(10) Patent No.: US 10,931,482 B2
(45) Date of Patent: *Feb. 23, 2021

(54) METHOD AND APPARATUS FOR CHANNEL ESTIMATION IN WIRELESS COMMUNICATION SYSTEM

(71) Applicant: Samsung Electronics Co., Ltd., Suwon-si (KR)

(72) Inventors: Jongho Oh, Seongnam-si (KR); Soon Chan Kwon, Incheon (KR); Daehoon Kim, Suwon-si (KR); Taeyeong Kim, Seoul (KR); Jungmin Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/747,409

(22) Filed: Jan. 20, 2020

(65) Prior Publication Data
US 2020/0153662 A1    May 14, 2020

Related U.S. Application Data

(63) Continuation of application No. 15/770,143, filed as application No. PCT/KR2016/011861 on Oct. 21, 2016, now Pat. No. 10,541,837.

(30) Foreign Application Priority Data

Oct. 21, 2015  (KR) .......................... 10-2015-0146893

(51) Int. Cl.
*H04L 25/02* (2006.01)
*H04L 5/00* (2006.01)
(Continued)

(52) U.S. Cl.
CPC ....... *H04L 25/0202* (2013.01); *H04B 7/0413* (2013.01); *H04B 7/0684* (2013.01);
(Continued)

(58) Field of Classification Search
CPC combination set(s) only.
See application file for complete search history.

(56) References Cited

U.S. PATENT DOCUMENTS 8,155,239 B2 * 4/2012 Lakkis ................ H04L 27/2602
375/299
8,175,119 B2 * 5/2012 Zhang ................ H04J 13/0014
370/203

(Continued)

FOREIGN PATENT DOCUMENTS

EP        3284199 A1      2/2018
KR        10-1161075 B1   7/2012
KR        10-2017-0020073 A  2/2017

OTHER PUBLICATIONS

ISA/KR, "International Search Report and Written Opinion of the International Searching Authority," International Application No. PCT/KR2016/011861, dated Jan. 23, 2017, 15 pages.

(Continued)

*Primary Examiner* — Linda Wong

(57) ABSTRACT

The present disclosure relates to a pre-5th-Generation (5G) or 5G communication system to be provided for supporting higher data rates Beyond 4th-Generation (4G) communication system such as Long Term Evolution (LTE). The present invention relates to a method and apparatus for channel estimation in a wireless communication system. A method for operating a transmitter comprises the operations of: transmitting a first reference signal through a first antenna; and transmitting a second reference signal through a second antenna, wherein the first reference signal includes (Continued)

a first Golay sequence, and the second reference signal includes a second Golay sequence.

20 Claims, 33 Drawing Sheets

(51) Int. Cl.
*H04J 13/00* (2011.01)
*H04B 7/06* (2006.01)
*H04B 7/0413* (2017.01)
*H04L 27/26* (2006.01)

(52) U.S. Cl.
CPC .......... *H04L 25/02* (2013.01); *H04L 25/0204* (2013.01); *H04L 25/0226* (2013.01); *H04L 27/2613* (2013.01); *H04J 13/0014* (2013.01); *H04L 5/0014* (2013.01); *H04L 5/0035* (2013.01); *H04L 5/0048* (2013.01)

(56) References Cited

U.S. PATENT DOCUMENTS

| | | | | |
|---|---|---|---|---|
| 8,219,891 | B2* | 7/2012 | Lakkis | H04B 7/0617 714/776 |
| 8,401,056 | B2* | 3/2013 | Lakkis | H04B 1/707 375/150 |
| 8,705,661 | B2* | 4/2014 | Sanderovich | H04L 25/0212 375/142 |
| 8,891,592 | B1 | 11/2014 | Zhang et al. | |
| 8,929,397 | B2* | 1/2015 | Zhang | H04J 13/0014 370/203 |
| 9,332,514 | B2* | 5/2016 | Sorin | H04W 56/001 |
| 2009/0097533 | A1 | 4/2009 | Lakkis | |
| 2009/0100316 | A1 | 4/2009 | Lakkis | |
| 2009/0122715 | A1* | 5/2009 | Lakkis | H04B 7/0617 370/252 |
| 2009/0160707 | A1 | 6/2009 | Lakkis | |
| 2009/0209206 | A1 | 8/2009 | Zou et al. | |
| 2010/0272154 | A1 | 10/2010 | Lakkis | |
| 2013/0044029 | A1 | 2/2013 | Yang et al. | |
| 2014/0044153 | A1 | 2/2014 | Anand et al. | |
| 2014/0204928 | A1* | 7/2014 | Sorin | H04L 7/10 370/338 |
| 2014/0314137 | A1* | 10/2014 | Lakkis | H04L 25/03006 375/232 |
| 2014/0321479 | A1* | 10/2014 | Zhang | H04L 69/22 370/474 |
| 2014/0348212 | A1* | 11/2014 | Lakkis | H04B 1/709 375/146 |
| 2014/0369213 | A1* | 12/2014 | Kim | H04W 72/085 370/252 |
| 2015/0156036 | A1* | 6/2015 | Genossar | H04L 25/0202 375/232 |
| 2015/0163826 | A1* | 6/2015 | Lakkis | H01Q 3/24 370/336 |
| 2015/0280862 | A1* | 10/2015 | Teplitsky | H04B 1/30 375/319 |
| 2016/0192363 | A1* | 6/2016 | Kasher | H04W 28/26 370/329 |
| 2016/0286011 | A1* | 9/2016 | Kasher | H04L 69/22 |
| 2017/0033844 | A1* | 2/2017 | Kasher | H04J 13/0014 |
| 2017/0257245 | A1* | 9/2017 | Shinagawa | H04L 27/2656 |

OTHER PUBLICATIONS

IEEE Standards Association, "Part 11: Wireless LAN Medium Access Control (MAC) and Physical Layer (PHY) Specifications, Amendment 3: Enhancements for Very High Throughput in the 60 GHz Band," IEEE Std 802.11ad-2010 (Amendment to IEEE Std 802.11-2012, as amended by IEEE Std 802.11ae-2012 and IEEE Std 802.11aa-2012), New York, Dec. 28, 2012, 628 pages.

Supplementary European Search Report dated Oct. 9, 2018 in connection with European Patent Application No. 16 85 7802, 13 pages.

Oh-Soon Shin et al., "Construction of Block Orthogonal Golay Sequences and Application to Channel Estimation of MIMO-OFDM Systems", IEEE Transactions on Communications, vol. 56, No. 1, Jan. 1, 2008, 5 pages.

Malte Schellmann et al., "Multi-User MIMO Channel Estimation in the Presence of Carrier Frequency Offsets", IEEE, Oct. 28, 2005, p. 462-466.

Communication pursuant to Article 94(3) EPC dated Aug. 6, 2019 in connection with European Patent Application No. 16 857 802.9, 8 pages.

Communication under Rule 71(3) EPC in connection with European Application No. 16857802.9 dated Mar. 27, 2020, 7 pages.

\* cited by examiner

METHOD AND APPARATUS FOR CHANNEL ESTIMATION IN WIRELESS COMMUNICATION SYSTEM

CROSS-REFERENCE TO RELATED APPLICATIONS AND CLAIM OF PRIORITY

This application is a continuation of application Ser. No. 15/770,143, which is the National Stage of International Application No. PCT/KR2016/011861, filed Oct. 21, 2016, which claims priority to Korean Patent Application No. 10-2015-0146893, filed Oct. 21, 2015, the disclosures of which are herein incorporated by reference in their entireties.

BACKGROUND

1. Field

The present disclosure relates to an electronic device a method and an apparatus for transmitting and receiving a signal for channel estimation in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the IEEE 802.11ad system, which is a conventional communication system employing an extremely-high-frequency band, a transmission apparatus transmits a Channel Estimation Field (CEF) formed of a Golay sequence for channel estimation. Also, a reception apparatus may estimate a channel based on the CEF received from the transmission apparatus. However, since this channel estimation method is for a Single-Input and Single-Output (SISO) system, using this method in an MIMO system cannot achieve accurate channel estimation.

SUMMARY

Therefore, an exemplary embodiment of the present disclosure is to provide a method and an apparatus for estimating a channel in a wireless communication system supporting Multiple-Input and Multiple-Output (MIMO) (hereinafter, referred to as an "MIMO system").

An exemplary embodiment of the present disclosure is to provide a method and an apparatus in which a transmitter of an MIMO system transmits a signal to minimize a channel estimation error and a receiver receives the signal.

An exemplary embodiment of the present disclosure is to provide a method and an apparatus for generating different reference signals based on Golay sequences generated using different seeds and for transmitting the different reference signals via separate antennas in an MIMO system.

An exemplary embodiment of the present disclosure is to provide a method and an apparatus for transmitting signals including the same Golay sequence via two or more antennas at different times based on the correlation of a Golay sequence in an MIMO system.

According to an exemplary embodiment of the present disclosure, an operation method of a transmission apparatus in a wireless communication system may include: transmitting a first reference signal through a first antenna; and transmitting a second reference signal through a second antenna, wherein the first reference signal may include a first Golay sequence generated based on a first seed, and the second reference signal may include a second Golay sequence generated based on a second seed.

According to an exemplary embodiment of the present disclosure, an operation method of a transmission apparatus in a wireless communication system may include: transmitting a first reference signal through a first antenna; and transmitting a second reference signal through a second antenna, wherein the first reference signal and the second reference signal may include the same Golay sequence, and a transmission start time for the second reference signal may be delayed by a threshold time from a transmission start time for the first reference signal.

According to an exemplary embodiment of the present disclosure, an operation method of a reception apparatus in a wireless communication system may include: receiving a signal through a first antenna and a second antenna; performing first correlation of the received signal of the first antenna using a first correlator; performing second correlation of the received signal of the second antenna using a second correlator; and estimating a channel based on a result of the first correlation and a result of the second correlation, wherein the first correlator is configured based on a first Golay sequence generated based on a first seed, and the second correlator is configured based on a second Golay sequence generated based on a second seed.

According to an exemplary embodiment of the present disclosure, a transmission apparatus in a wireless communication system may include: a first antenna configured to transmit a first reference signal; a second antenna configured to transmit a second reference signal; and a processor configured to generate the first reference signal and the second reference signal, wherein the first reference signal may include a first Golay sequence generated based on a first seed, and the second reference signal may include a second Golay sequence generated based on a second seed.

According to an exemplary embodiment of the present disclosure, a transmission apparatus in a wireless communication system may include: a first antenna configured to transmit a first reference signal; a second antenna configured to transmit a second reference signal; and a processor configured to configure the first reference signal and the second reference signal using the same Golay sequence and to delay a transmission start time for the second reference signal by a threshold time from a transmission start time for the first reference signal.

According to an exemplary embodiment of the present disclosure, a reception apparatus in a wireless communication system may include: a first antenna and a second antenna configured to receive a reference signal transmitted from a transmission apparatus; a first correlator configured to perform first correlation of the received signal of the first antenna; a second correlator configured to perform second correlation of the received signal of the second antenna; and a channel estimator configured to estimate a channel based on a result of the first correlation and a result of the second correlation, wherein the first correlator is configured based on a first Golay sequence generated based on a first seed, and the second correlator is configured based on a second Golay sequence generated based on a second seed.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 illustrates the configuration of Golay sequences Ga128(k) and Gb128(k);

FIGS. 17A and 17B illustrate the configuration of a transmission signal for channel estimation according to various exemplary embodiments of the present disclosure;

DETAILED DESCRIPTION

Hereinafter, exemplary embodiments of the present disclosure will be described with reference to the accompanying drawings. Further, in the following description of the present disclosure, a detailed description of known functions or configurations incorporated herein will be omitted when it may make the subject matter of the present disclosure rather unclear. Further, terms described later are defined in consideration of functions of the present disclosure, but may vary according to the intention or convention of a user or operator. Therefore, the definitions of the terms should be made based on the contents throughout the specification.

The present disclosure relates to an electronic device a method and an apparatus for transmitting and receiving a signal for channel estimation in a wireless communication system.

The terminology used herein is for the purpose of describing particular embodiments only and is not intended to limit various embodiments. For example, terms to indicate a signal type, terms to indicate a layer to which a message is transmitted, terms to indicate an antenna structure and antenna components, terms to denote items included in feedback information, and the like, which are used herein, are provided for the convenience of description. Therefore, the present disclosure is not limited by the following terms, and other terms having equivalent technical meanings may be used. Further, the present disclosure is not limited by the following terms and designations and may be applied to other systems according to other standards in the same manner. Singular forms may include plural forms as well unless the context clearly indicates otherwise.

Figure 1:
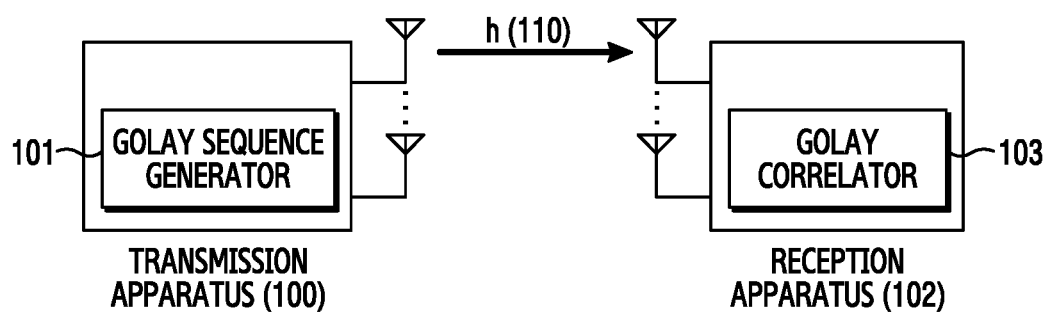
FIG. 1 illustrates the configuration of a wireless communication system according to an exemplary embodiment of the present disclosure.

FIG. 1 illustrates the configuration of a wireless communication system according to an exemplary embodiment of the present disclosure. In FIG. 1, a transmission apparatus 100 may be a base station or a terminal. Also, a reception apparatus 102 may be a base station or a terminal. For example, the transmission apparatus 100 may be a base station, and the reception apparatus 102 may be a terminal. Alternatively, the transmission apparatus 100 may be a terminal, and the reception apparatus may be a base station. In addition, both the transmission apparatus 100 and the reception apparatus 102 may be terminals.

Referring to FIG. 1, the transmission apparatus 100 includes a plurality of transmitting antennas. The transmission apparatus 100 transmits a signal to the reception apparatus 102 using the plurality of transmitting antennas. In particular, the transmission apparatus 100 according to the exemplary embodiment of the present disclosure may generate a signal (e.g., a reference signal) for the reception apparatus 102 to estimate a channel (h) 110 using a Golay sequence generator 101 and may transmit the generated signal to the reception apparatus 102. For example, the transmission apparatus 100 may generate a Golay sequence by performing a recursive procedure represented below by Equation 1 using the Golay sequence generator 101. The transmission apparatus 100 may transmit a reference signal including the generated Golay sequence to the reception apparatus 102. Here, the Golay sequence may be included in a Channel Estimation Field (CEF) of the reference signal.

$$A_0(k)=\delta(k)$$

$$B_0(k)=\delta(k)$$

$$A_n(k)=W_n A_{n-1}(k)+B_{n-1}(k-D_n)$$

$$B_n(k)=W_n A_{n-1}(k)-B_{n-1}(k-D_n) \quad \text{Equation 1}$$

Here, n=1, 2, ..., N, which may denote the number of iterations. Further, k=0, 1, ..., 2N−1, and $D_n=2^{P_n}$, which may denote a delay, where $P_n$ may be a permutation of {0, 1, ..., N}. $W_n$ may be an arbitrary complex number of unit magnitude. $D_n$ and $W_n$ may denote seeds for generating a Golay sequence. $A_n(k)$ and $B_n(k)$ are 0 where k<0, k≥2n. δ(k) may denote a delta function.

Figure 2:
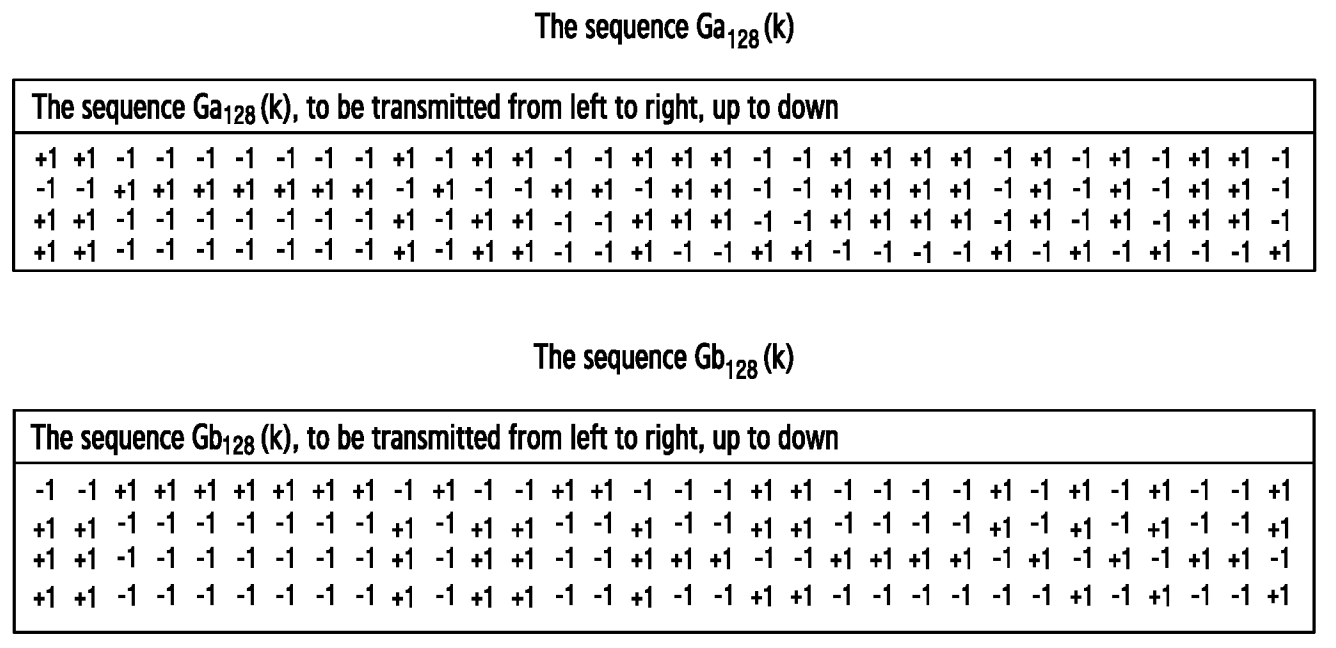

The transmission apparatus 100 may generate a Golay sequence based on Dn and Wn according to Equation 1. For example, the transmission apparatus 100 may generate Golay sequences $Ga_{128}(k)=A_7(128-k)$ and $Gb_{128}(k)=B_7(128-k)$, illustrated in FIG. 2, based on $D_n$ and $W_n$ represented by Equation 2.

$$D_n=[1,8,2,4,14,32,64]$$

$$W_n=[-1,-1,-1,-1,1,-1,-1] \quad \text{Equation 2}$$

The transmission apparatus 100 according to the exemplary embodiment of the present disclosure may generate and transmit a reference signal for minimizing a channel estimation error based on a Golay sequence. For example, the transmission apparatus 100 may generate different Golay sequences based on different seeds and may generate reference signals including the different Golay sequences. Here, the transmission apparatus 100 may transmit the generated reference signals to the reception apparatus 102 via different antennas. In another example, the transmission apparatus 100 may generate a Golay sequence using a particular seed and may transmit the same reference signals including the same Golay sequence via different antennas. Here, the transmission apparatus 100 may control the reference signals to be transmitted at different times. A method for the transmission apparatus 100 to generate and transmit a reference signal based on a Golay sequence according to an exemplary embodiment of the present disclosure will be described in detail below.

The reception apparatus 102 may include a plurality of receiving antennas. The reception apparatus 102 may receive a signal from the transmission apparatus 100 using the plurality of receiving antennas. In particular, the reception apparatus 102 may include a Golay correlator 103 and may estimate the channel (h) 110 between the transmission apparatus 100 and the reception apparatus 102 using the Golay correlator 103. Here, the Golay correlator 103 may be configured based on a Golay sequence generation method of the transmission apparatus 100. Therefore, a method for generating and transmitting a reference signal based on a Golay sequence may be preset in each of the transmission apparatus 100 and the reception apparatus 102 or may be agreed upon between the transmission apparatus 100 and the reception apparatus 102 via the exchange of signals.

Figure 3A:
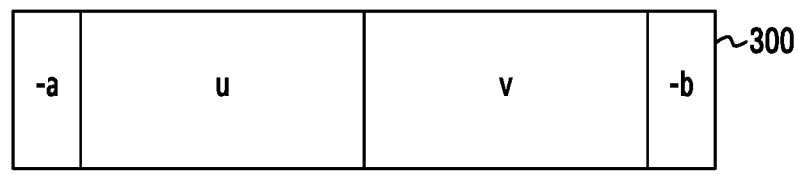
FIGS. 3A and 3B illustrate a Channel Estimation Field (CEF) including a Golay sequence.
Figure 3B:
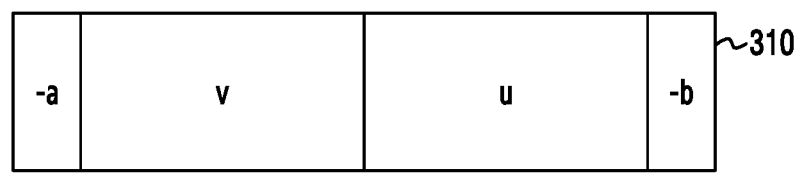

FIGS. 3A and 3B illustrate a CEF including a Golay sequence. FIG. 3A illustrates a CEF 300 for a system supporting a single carrier PHY (hereinafter referred to as a 'SC PHY CEF'), and FIG. 3B illustrates a CEF 310 for an Orthogonal Frequency Division Multiplexing (OFDM) PHY system (hereinafter referred to as an 'OFDM PHY CEF'). In FIGS. 3A and 3B, a denotes Ga128, b denotes Gb128, u denotes Gu512, and v denotes Gv512. Here, Ga128 denotes a Golay a sequence $Ga_{128}(k)$ including 128 samples illustrated in FIG. 2, and Gb128 denotes a Golay b sequence $Gb_{128}(k)$ including 128 samples. Also, Gu512 and Gv512 respectively denote a Golay u sequence and a Golay v sequence, each of which includes 512 samples. Here, Gu512 may include −Gb128, −Ga128, Gb128, and −Ga128 in order, and Gv512 may include −Gb128, Ga128, −Gb128, −Ga128 in order. That is, each of the Golay u sequence and the Golay v sequence may include the Golay a sequence and the Golay b sequence.

Figure 4:
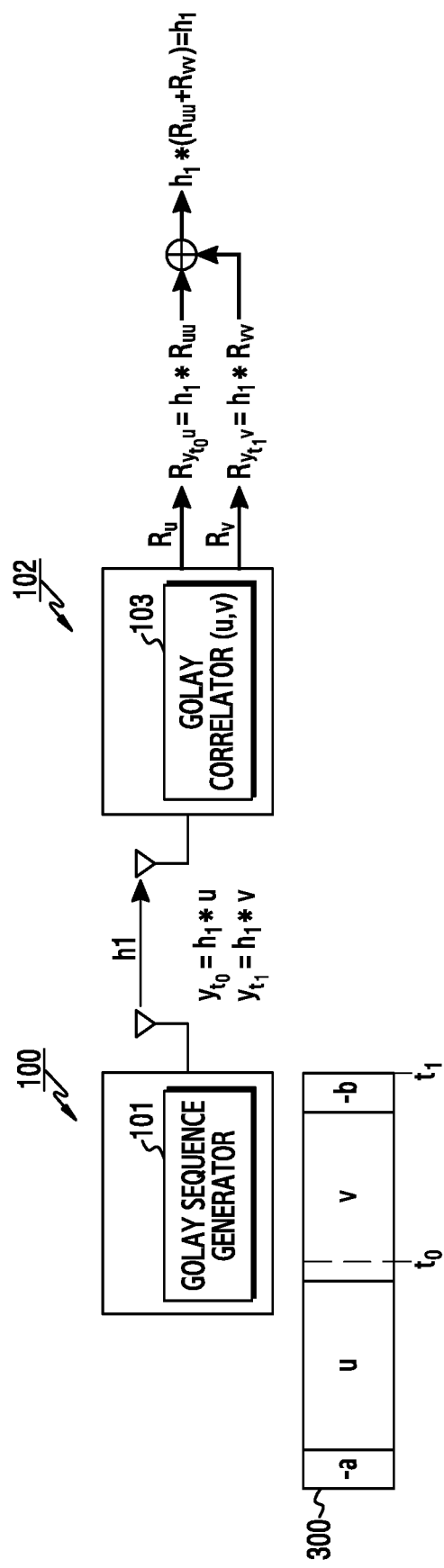
FIG. 4 illustrates an example of transmitting and receiving the CEF of FIG. 3A in a wireless communication system.

FIG. 4 illustrates an example of transmitting and receiving the CEF of FIG. 3A in a wireless communication system.

Referring to FIG. 4, a transmission apparatus 100 transmits a reference signal including the SC PHY CEF 300 illustrated in FIG. 3A to a reception apparatus 102 via one antenna. Accordingly, the reception apparatus 102 may receive one reference signal transmitted from the transmission apparatus 100 via one antenna and may estimate a channel $h_1$. Here, the signal received by the reception apparatus 102 may be represented by Equation 3.

$$y_{t_0}=h_1 * u$$

$$y_{t_1}=h_1 * v \quad \text{Equation 3}$$

Here, $yt_0$ denotes a signal received at time $t_0$, and $yt_1$ denotes a signal received at time $t_1$. $h_1$ denotes a channel between one antenna of the transmission apparatus 100 and one antenna of the reception apparatus 102. u denotes Gu512 that is a Golay u sequence including 512 samples, and v denotes Gv512 that is a Golay u sequence including 512 samples.

The reception apparatus 102 may input the received signal represented by Equation 3 into the Golay correlator 103, thereby obtaining a signal represented by Equation 4. The Golay correlator 103 may include Gu512 and Gv512.

$$R_{y_{t_0}u} = h_1 * R_{uu} \quad\quad\quad\quad \text{Equation 4}$$
$$R_{y_{t_1}v} = h_1 * R_{vv}$$

Here, $R_{y_{t_0}u}$ denotes a signal obtained by inputting a signal $y_{t_0}$ received at time $t_0$ into the Golay correlator 103, and $R_y t_{1_v}$ denotes a signal obtained by inputting a signal $y_{t_1}$ received at time $t_1$ into the Golay correlator 103.

The reception apparatus 102 may add the obtained signals represented by Equation 4, thereby obtaining a channel $h_1$ represented by Equation 5.

$$h_1 * (R_{uu} + R_{vv}) = h_1 \quad\quad\quad\quad \text{Equation 5}$$

For example, the reception apparatus 102 may estimate the channel $h_1$ using the characteristics of Golay sequences Gu512 and Gv512 such that $R_{uu}$ and $R_{vv}$ are impulse signals.

As described above in FIG. 4, the transmission apparatus 100 may estimate a channel using the SC PHY CEF 300 of FIG. 3A or the OFDM PHY CEF 310 of FIG. 3B, which is suitable for SISO channel estimation. That is, the CEF transmission/reception scheme illustrated in FIGS. 3A, 3B, and 4 is not suitable for MIMO channel estimation. For example, when the transmission apparatus 100 transmits the same CEF via a plurality of antennas, the reception apparatus 102 cannot accurately estimate an MIMO channel due to interaction between the same CEFs. Therefore, an exemplary embodiment of the present disclosure proposes a CEF transmission/reception scheme capable of MIMO channel estimation in an MIMO system.

Figure 5:
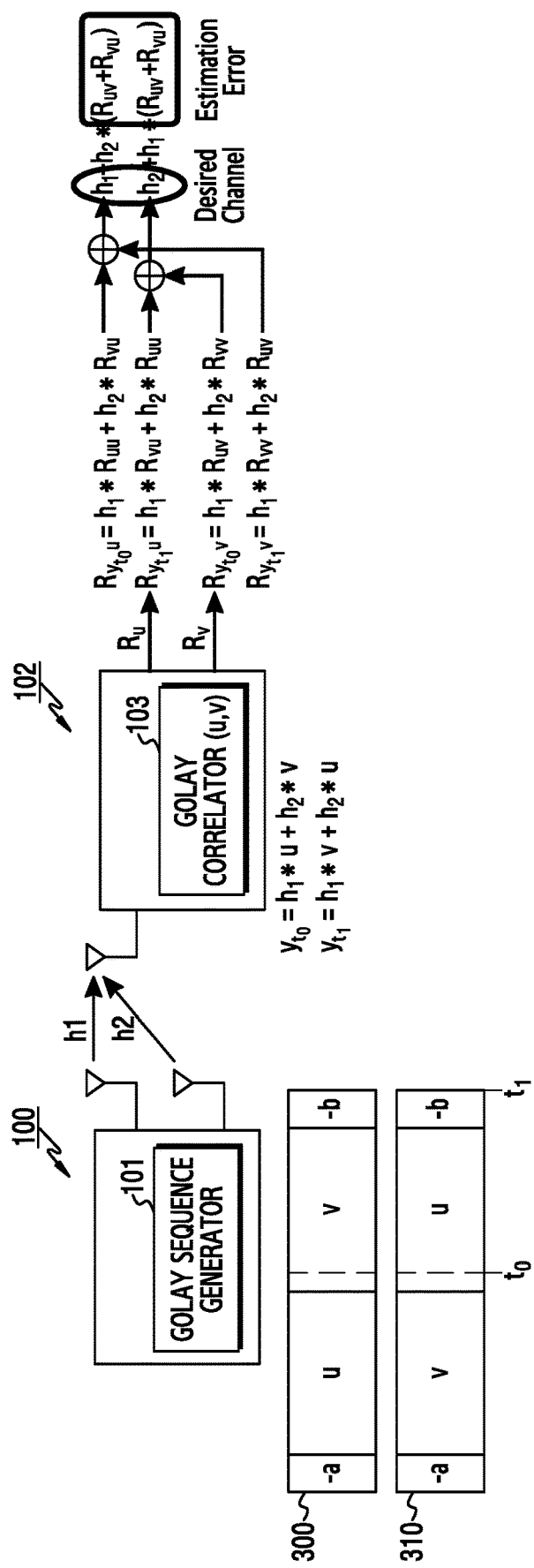
FIG. 5 illustrates an example of transmitting the CEFs illustrated in FIGS. 3A and 3B in a 2×2 MIMO system according to an exemplary embodiment of the present disclosure.

FIG. 5 illustrates an example of transmitting the CEFs illustrated in FIGS. 3A and 3B in a 2×2 MIMO system according to an exemplary embodiment of the present disclosure. Although FIG. 5 shows only a first receiving antenna of a reception apparatus 102 for convenience, a second receiving antenna of the reception apparatus 102 may also be configured in the same manner.

Referring to FIG. 5, a first transmitting antenna of a transmission apparatus 100 transmits the SC PHY CEF 300 illustrated in FIG. 3A, and a second transmitting antenna transmits the OFDM PHY CEF 310 illustrated in FIG. 3B. The SC PHY CEF 300 and the OFDM PHY CEF 310 transmitted from the transmission apparatus 100 pass through a channel $h_1$ and a channel $h_2$ and are received by a first receiving antenna of the reception apparatus 102. The signals received by the reception apparatus 102 may be represented by Equation 6.

$$y_{t_0} = h_1 * u + h_2 * v$$
$$y_{t_1} = h_1 * v + h_2 * u \quad\quad\quad\quad \text{Equation 6}$$

Here, $y_{t_0}$ denotes a signal received at time $t_0$, and $y_{t_1}$ denotes a signal received at time $t_1$. $h_1$ denotes a channel between the first transmitting antenna of the transmission apparatus 100 and the first receiving antenna of the reception apparatus 102, and $h_2$ denotes a channel between the second transmitting antenna of the transmission apparatus 100 and the first receiving antenna of the reception apparatus 102. u denotes Gu512 that is a Golay u sequence including 512 samples, and v denotes Gv512 that is a Golay u sequence including 512 samples.

The reception apparatus 102 may input the received signal represented by Equation 6 into a Golay correlator 103, thereby obtaining a signal represented by Equation 7. The Golay correlator 103 may include Gu512 and Gv512.

$$R_{y_{t_0}u} = h_1 * R_{uu} + h_2 * R_{vu} \quad\quad\quad \text{Equation 7}$$
$$R_{y_{t_1}u} = h_1 * R_{vu} + h_2 * R_{uu}$$
$$R_{y_{t_0}v} = h_1 * R_{uv} + h_2 * R_{vv}$$
$$R_{y_{t_1}v} = h_1 * R_{vv} + h_2 * R_{uv}$$

Here, $R_{y_{t_0}u}$ and $R_y t_{0_v}$ denote signals obtained by inputting a signal $y_{t_0}$ received at time $t_0$ into the Golay correlator 103, and $R_y t_{1_v}$ and $R_y t_{1_u}$ denote signals obtained by inputting a signal $y_{t_1}$ received at time $t_1$ into the Golay correlator 103.

The reception apparatus 102 may add $R_{y_{t_0}u}$ and $R_y t_{1_v}$, and may add $R_y t_{1_u}$ and $R_y t_{0_v}$, thereby obtaining channels $h_1$ and $h_2$ according to Equation 8.

$$R_{y_{t_0}u} + R_{y_{t_1}v} = h_1 + h_2 * (R_{uv} + R_{vu}) \quad\quad \text{Equation 8}$$
$$R_{y_{t_0}v} + R_{y_{t_1}u} = h_2 + h_1 * (R_{uv} + R_{vu})$$

Figure 6:
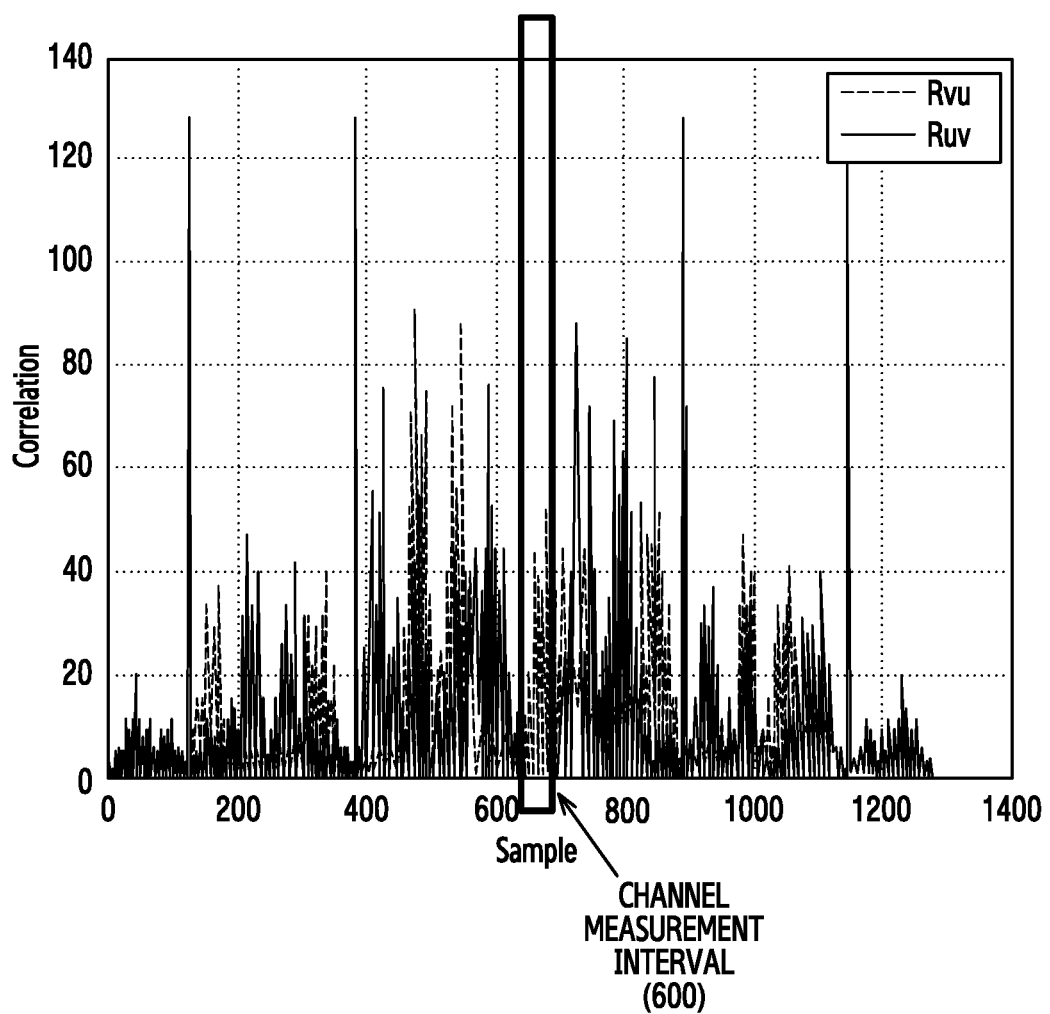
FIG. 6 illustrates the correlation between $R_{vu}$ and $R_{uv}$ according to an exemplary embodiment of the present disclosure.

Here, as illustrated in FIG. 6, in a channel measurement interval 600, $R_{uv}$ is 0, but $R_{vu}$ is not 0. Here, the channel measurement interval 600 may include 63 samples. Therefore, when the reception apparatus 102 estimates channel $h_1$ and $h_2$ according to Equation 8, a channel estimation error may occur due to $R_{vu}$.

Figure 7:
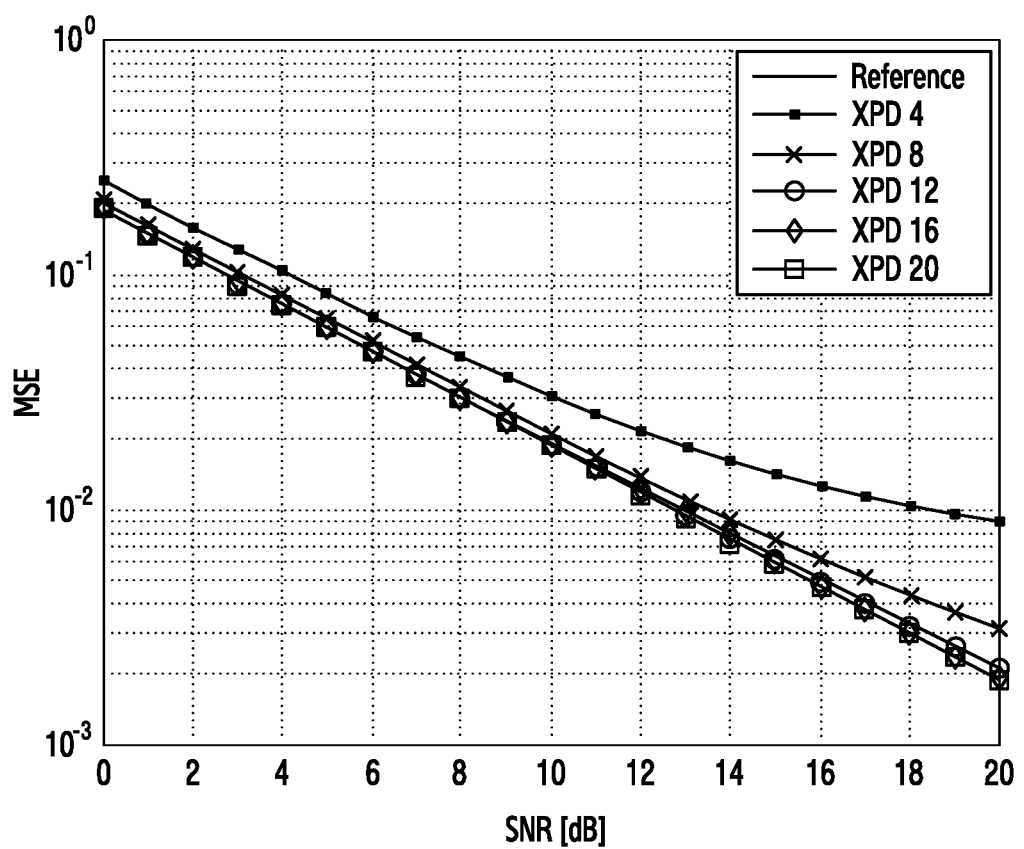
FIG. 7 shows a graph illustrating a channel estimation error in the CEF transmission/reception scheme of FIG. 5.

FIG. 7 shows a graph illustrating a channel estimation error in the CEF transmission/reception scheme of FIG. 5. FIG. 7 shows the Mean Square Error (MSE) according to Signal-to-Noise Ratio (SNR). In FIG. 7, Reference shows optimal performance. Further, XPD n (in dB, where n is 4, 8, 12, 16, and 20) denotes the ratio of the size of $h_1$ to the size of $h_2$. The estimation of $h_1$ by the reception apparatus 102 is affected by $R_{vu}$ by the size of $h_2$. Therefore, referring to FIG. 7, the lower XPD is, the more MSE performance deteriorates. Particularly, an XPD of 4 dB has an MSE value measured greater than that for an XPD of greater than 4 dB. Thus, the following exemplary embodiment proposes a CEF transmission/reception scheme in which channel estimation performance does not deteriorate even when XPD is low.

Figure 8A:
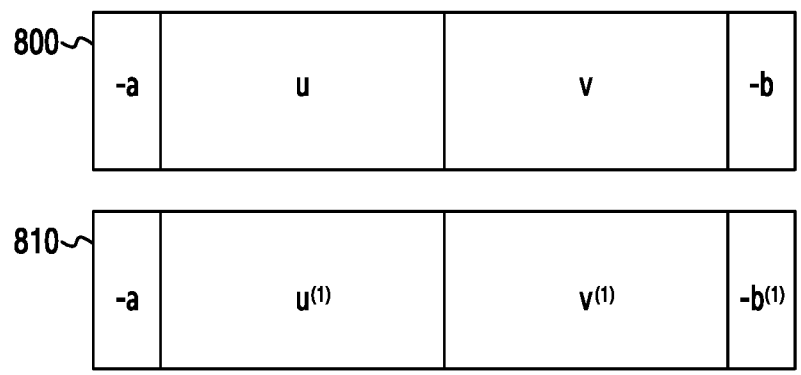
FIGS. 8A and 8B illustrate the configuration of a transmission signal for channel estimation according to an exemplary embodiment of the present disclosure.
Figure 8B:
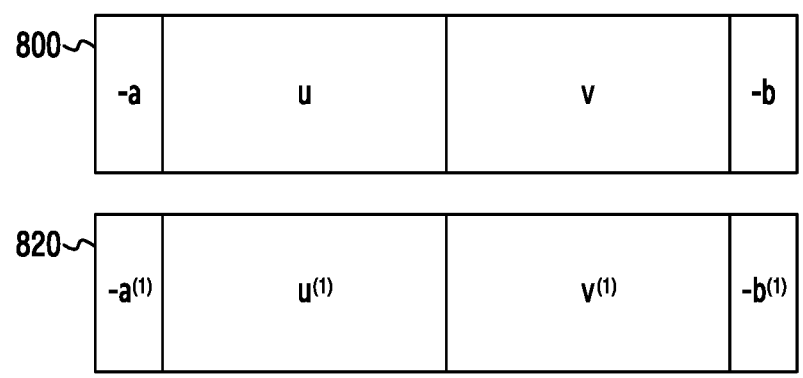

FIGS. 8A and 8B illustrate the configuration of a transmission signal for channel estimation according to an exemplary embodiment of the present disclosure.

Referring to FIGS. 8A and 8B, a transmission apparatus 100 according to the exemplary embodiment of the present disclosure may generate two different CEFs and may transmit the CEFs through separate antennas. For example, the transmission apparatus 100 may generate a first CEF 800 and a second CEF 810 illustrated in FIG. 8A, or may generate a first CEF 800 and a second CEF 820 illustrated in FIG. 8B. For example, depending on the channel measurement interval prediction method, the first CEF and the second CEF may be generated illustrated in FIG. 8A, or the first CEF and the second CEF may be generated illustrated in FIG. 8B.

Referring to FIG. 8A, the first CEF 800 may include −a, u, v, and −b, like the CEF 300 of FIG. 3A, and the second CEF 810 may include −a, $u^{(1)}$, $v^{(1)}$, and $-b^{(1)}$. Referring to FIG. 8B, the first CEF 800 may include −a, u, v, and −b, like the CEF 300 of FIG. 3A, and the second CEF 820 may include $-a^{(1)}$, $u^{(1)}$, $v^{(1)}$, and $-b^{(1)}$. Here, $u^{(1)}$ denotes $G^{(1)}u512$, and $G^{(1)}u512$ includes $-b^{(1)}$, $-a^{(1)}$, $b^{(1)}$, and $-a^{(1)}$ in order. Further, $v^{(1)}$ denotes $G^{(1)}v512$, and $G^{(1)}v512$ includes $-b^{(1)}$, $a^{(1)}$, $-b^{(1)}$, and $-a^{(1)}$ in order. Here, $a^{(1)}$ and $b^{(1)}$ may be obtained based on Dn and Wn represented by Equation 9.

$$D_n=[1,8,2,4,16,32,64]$$

$$W_n=[1,-1,-1,-1,1,-1,-1]$$ [Equation 9]

For example, a and b respectively denote $Ga_{128}(k)$ and $Gb_{128}(k)$ obtained by applying Dn and Wn in Equation 2 to Equation 1, and $a^{(1)}$ and $b^{(1)}$ respectively denote $G^{(1)}a_{128}(k)$ and $G^{(1)}b_{128}(k)$ obtained by applying Dn and Wn in Equation 9 to Equation 1. Here, Wn in Equation 2 and Wn in Equation 9 are different, while Dn in Equation 2 and Dn in Equation 9 are the same. Using the same Dn in Equation 2 and Equation 9 is for convenience in implementing a correlator. Therefore, Dn in Equation 2 and Dn in Equation 9 may be set to be different depending on the design method.

Figure 9:
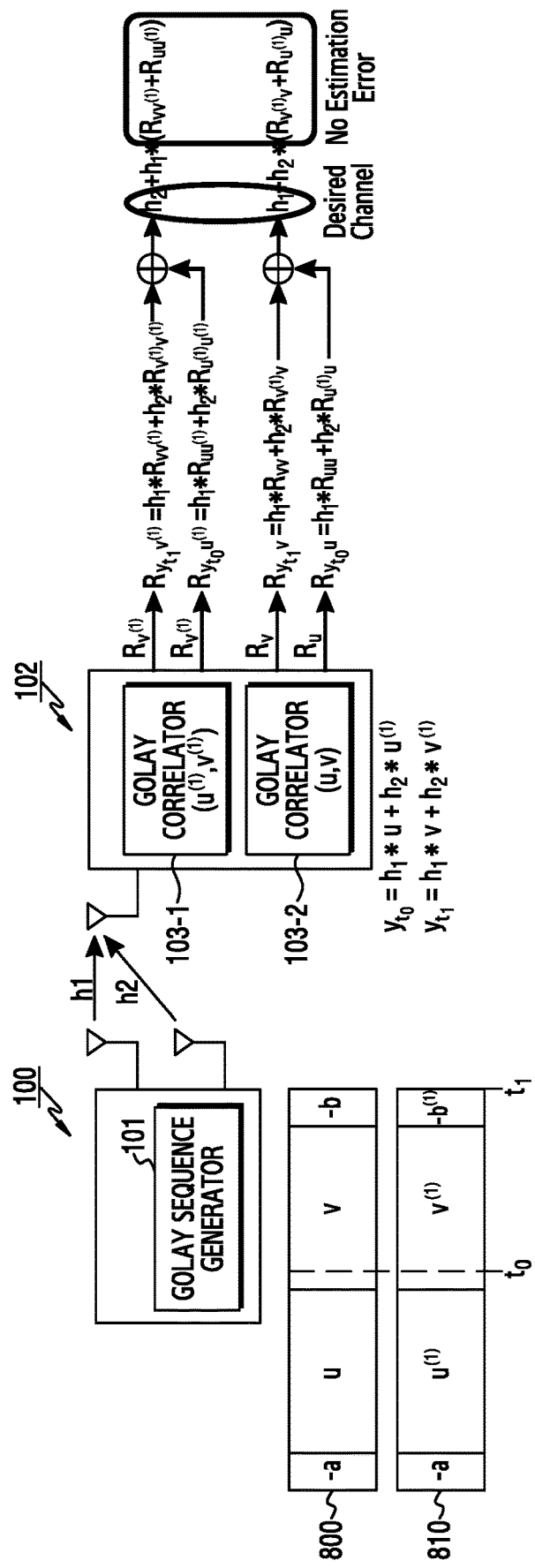
FIG. 9 illustrates an example of transmitting the CEFs of FIG. 8A according to an exemplary embodiment of the present disclosure.

FIG. 9 illustrates an example of transmitting the CEFs of FIG. 8A according to an exemplary embodiment of the present disclosure. Here, in FIG. 9, a 2×2 MIMO system is assumed, but only a first receiving antenna of a reception apparatus 102 is shown for convenience. However, a second receiving antenna of the reception apparatus 102 may also be configured in the same manner. Although FIG. 9 illustrates a case of transmitting and receiving the first CEF and the second CEF of FIG. 8A, the first CEF and the second CEF of FIG. 8B may be transmitted and received in the same manner.

Referring to FIG. 9, a Golay sequence generator 101 of a transmission apparatus 100 generates a first CEF 800 and a second CEF 810, as illustrated in FIG. 8A. The transmission apparatus 100 transmits the first CEF 800 through a first transmitting antenna and transmits the second CEF 810 through a second transmitting antenna. The first CEF 800 and the second CEF 810 transmitted from the transmission apparatus 100 pass through a channel $h_1$ and a channel $h_2$ and are received by the first receiving antenna of the reception apparatus 102. The signals received by the reception apparatus 102 may be represented by Equation 10.

$$y_{t_0} = h_1 * u + h_2 * u^{(1)}$$

$$y_{t_1} = h_1 * v + h_2 * v^{(1)}$$ Equation 10

Here, $y_{t_0}$ denotes a signal received at time $t_0$, and $y_{t_1}$ denotes a signal received at time $t_1$. $h_1$ denotes a channel between the first transmitting antenna of the transmission apparatus 100 and the first receiving antenna of the reception apparatus 102, and $h_2$ denotes a channel between the second transmitting antenna of the transmission apparatus 100 and the first receiving antenna of the reception apparatus 102. u denotes Gu512, v denotes Gv512, $u^{(1)}$ denotes $G^{(1)}u512$, and $v^{(1)}$ denotes $G^{(1)}v512$.

The reception apparatus 102 may input the received signal represented by Equation 10 into a first Golay correlator 103-1 and a second Golay correlator 103-2, thereby obtaining a signal represented by Equation 11. The first Golay correlator 103-1 may include $G^{(1)}u512$ and $G^{(1)}v512$, and the second Golay correlator 103-2 may include Gu512 and Gv512.

$$R_{y_{t_0}u} = h_1 * R_{uu} + h_2 * R_{u^{(1)}u}$$ Equation 11

$$R_{y_{t_1}v} = h_1 * R_{vv} + h_2 * R_{v^{(1)}v}$$

$$R_{y_{t_0}u^{(1)}} = h_1 * R_{uu^{(1)}} + h_2 * R_{u^{(1)}u^{(1)}}$$

$$R_{y_{t_1}v^{(1)}} = h_1 * R_{vv^{(1)}} + h_2 * R_{v^{(1)}v^{(1)}}$$

Here, $R_{y_{t_0}u^{(1)}}$ and $R_{y_{t_0}u}$ denote signals obtained by inputting a signal $y_{t_0}$ received at time $t_0$ into the first Golay correlator 103-1 and the second Golay correlator 103-2, and $R_{y_{t_1}v}^{(1)}$ and $R_{y_{t_1}v}$ denote signals obtained by inputting a signal $y_{t_1}$ received at time $t_1$ into the first Golay correlator 103-1 and the second Golay correlator 103-2.

The reception apparatus 102 may add $R_{y_{t_0}u}^{(1)}$ and $R_{y_{t_1}v}^{(1)}$ and may add $R_{y_{t_0}u}$ and $R_{y_{t_1}v}$, thereby estimating channels $h_1$ and $h_2$ according to Equation 12.

$$h_1+h_2*(R_{v^{(1)}v}+R_{u^{(1)}u})$$

$$h_2+h_1*(R_{vv^{(1)}}+R_{uu^{(1)}})$$ Equation 12

Figure 10:
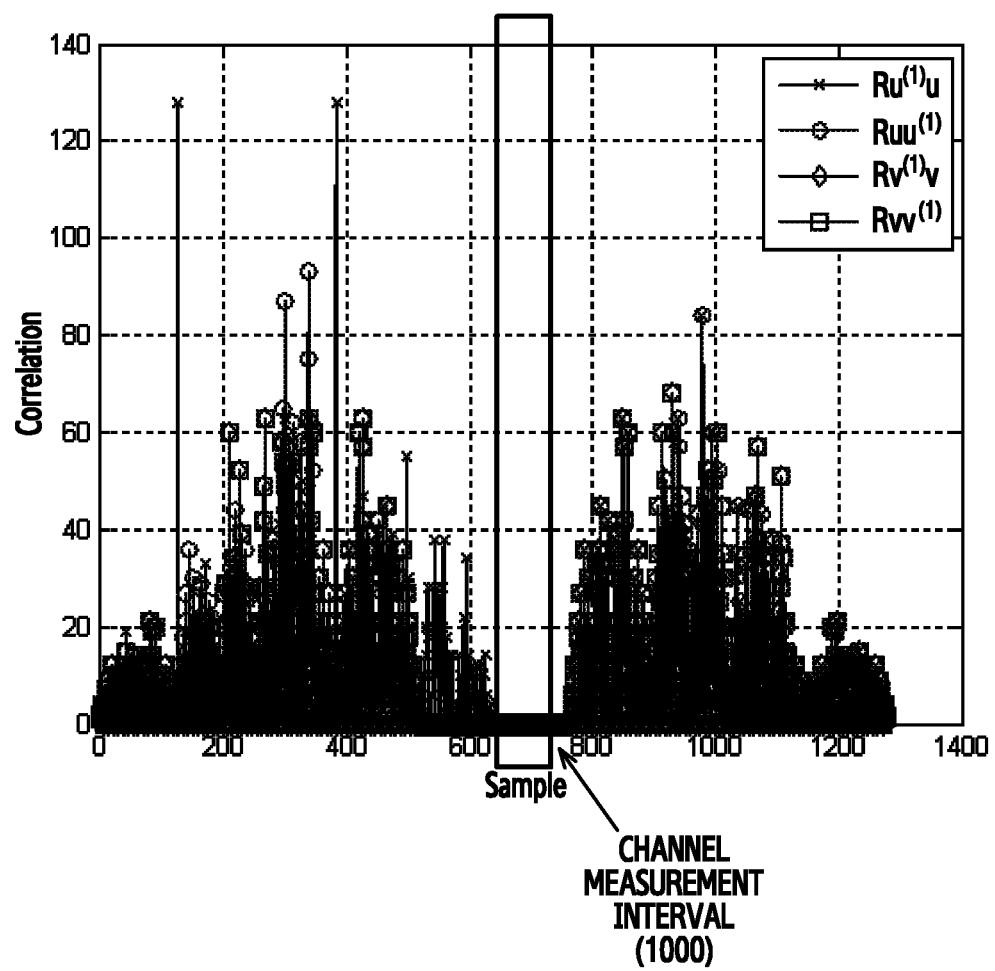
FIG. 10 illustrates the correlation between $R_{vv}^{(1)}$, $R_{uu}^{(1)}$, $R_v{}^{(1)}{}_v$, and $R_u{}^{(1)}{}_u$ according to an exemplary embodiment of the present disclosure.

Here, as illustrated in FIG. 10, in a channel measurement interval 1000, $R_{vv}^{(1)}$, $R_{uu}^{(1)}$, $R_{v}^{(1)}{}_{v}$, and $R_{u}^{(1)}{}_{u}$ are 0. The channel measurement interval 1000 may include 63 samples. Therefore, when the reception apparatus 102 estimates the channel $h_1$ and $h_2$ according to Equation 12, no channel estimation error occurs. Here, as in FIG. 10, $R_{vv}^{(1)}$, $R_{uu}^{(1)}$, $Rv^{(1)}v$, and $Ru^{(1)}u$ are 0 in the channel measurement interval 1000, because $u^{(1)}$ has an internal sign opposite to that of v−1, which is reversed v, and $v^{(1)}$ has an internal sign opposite to that of u−1, which is reversed u. For example, v−1 may include −a−1, −b−1, a−1, and −b−1; and v−1 in $u^{(1)}$ may include a−1, −b−1, −a−1, −b−1. Further, u−1 may include −a−1, b−1, −a−1, and −b−1; and v−1 $v^{(1)}$ in may include a−1, b−1, a−1, and −b−1.

Figure 11:
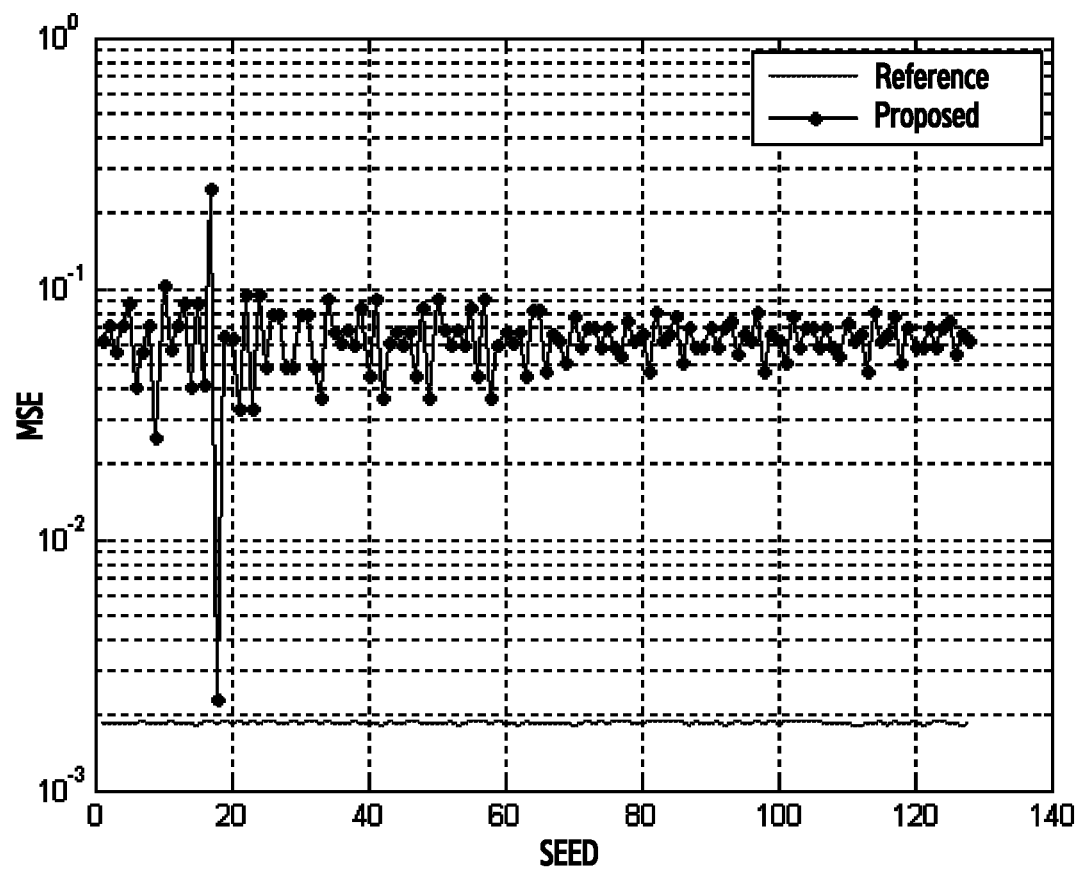
FIG. 11 shows a graph illustrating channel estimation errors by seed for generating a Golay sequence.

Only Wn illustrated in Equation 9 may make $R_{vv}^{(1)}$, $R_{uu}^{(1)}$, $Rv^{(1)}v$, and $Ru^{(1)}u$ be 0 in the channel measurement interval 1000 in FIG. 10. For example, referring to channel estimation errors by seed illustrated in FIG. 11, a channel estimation error of an eighteenth seed among 128 seeds $W_n$ has a remarkably lower MSE value than those of other seeds, which indicates that interference components may be eliminated or minimized in channel estimation using sequences based on the eighteenth seed. Referring to FIG. 10, among the 128 seeds $W_n$ for generating a Golay sequence, only the eighteenth seed $W_n$ illustrated in Equation 9 has a characteristic of making $R_{vv}^{(1)}$, $R_{uu}^{(1)}$, $Rv^{(1)}v$, and $Ru^{(1)}u$ be 0 in the channel measurement interval 1000.

In some exemplary embodiments, the transmission apparatus 100 may select two seeds $W_n$ from among a plurality of seeds Wn for generating a Golay sequence such that $R_{vv}^{(1)}$, $R_{uu}^{(1)}$, $Rv^{(1)}v$, and $Ru^{(1)}u$ are 0. For example, the transmission apparatus 100 may select $W_n$ in Equation 2 and $W_n$ in Equation 9 from among the 128 seeds $W_n$. The reception apparatus 102 may receive sequences generated based on $W_n$ in Equation 2 and $W_n$ in Equation 9, thereby eliminating interference components through $u^{(1)}$ and $v^{(1)}$.

In some other exemplary embodiments, the transmission apparatus 100 may select two seeds from among a plurality of seeds $D_n$ for generating a Golay sequence such that $R_{vv}^{(1)}$, $R_{uu}^{(1)}$, $Rv^{(1)}v$, and $Ru^{(1)}u$ are 0. In some other exemplary embodiments, the transmission apparatus 100 may select combinations of two seeds from among combinations of a plurality of seeds $D_n$ and $W_n$ for generating a Golay sequence such that $R_{vv}^{(1)}$, $R_{uu}^{(1)}$, $Rv^{(1)}v$, and $Ru^{(1)}u$ are 0.

Seeds $D_n$, seeds $W_n$, or combinations thereof to minimize interference components of the reception apparatus 102 may be obtained via a simulation or experimental result or may be determined to satisfy a particular relational equation. For example, the transmission apparatus 100 may determine a seed to generate a Golay v sequence in which at least some components have a sign opposite to that of some components in the reverse of a Golay u sequence determined based on another seed. In another example, the transmission apparatus 100 may determine a seed to generate a Golay u sequence in which at least some components have a sign opposite to that of some components in the reverse of a Golay v sequence determined based on another seed.

Figure 12:
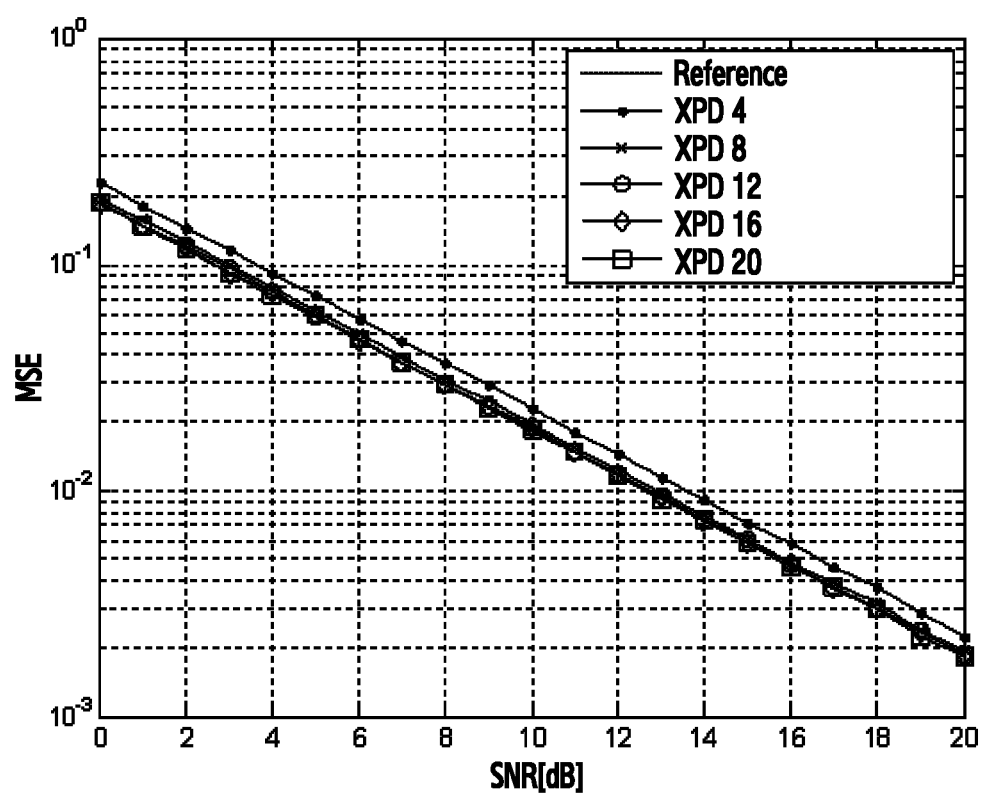
FIG. 12 shows a graph illustrating a channel estimation error in the CEF transmission/reception scheme of FIG. 9.

FIG. 12 shows a graph illustrating a channel estimation error in the CEF transmission/reception scheme of FIG. 9. FIG. 12 shows the MSE according to SNR. In FIG. 12, Reference shows optimal performance. Further, XPD n (in dB, where n is 4, 8, 12, 16, and 20) denotes the ratio of the size of $h_1$ to the size of $h_2$. FIG. 12 shows that MSE performance is similar to the performance of Reference regardless of the XPD value. Although there is a slight difference between the MSE value of XPD 4 and the performance of Reference, the desired strength of a signal at the same SNR is reduced due to interference, and thus the MSE difference between XPD and Reference is not regarded as performance deterioration. According to various exemplary embodiments of the present disclosure, the transmission apparatus 100 may perform transmission by delaying the second antenna by 36.48 ns or shorter in order to improve overall frame performance.

As shown in FIG. 9, when a channel is estimated by transmitting and receiving the first CEF and the second CEF based on the CEFs shown in FIGS. 8A and 8B, the reception apparatus 102 needs two correlators for each receiving antenna. However, in the exemplary embodiment of the present disclosure, a correlator may be reused in terms of time, and thus one correlator may be included for each antenna, which will be described in detail below with reference to FIG. 13.

Figure 13:
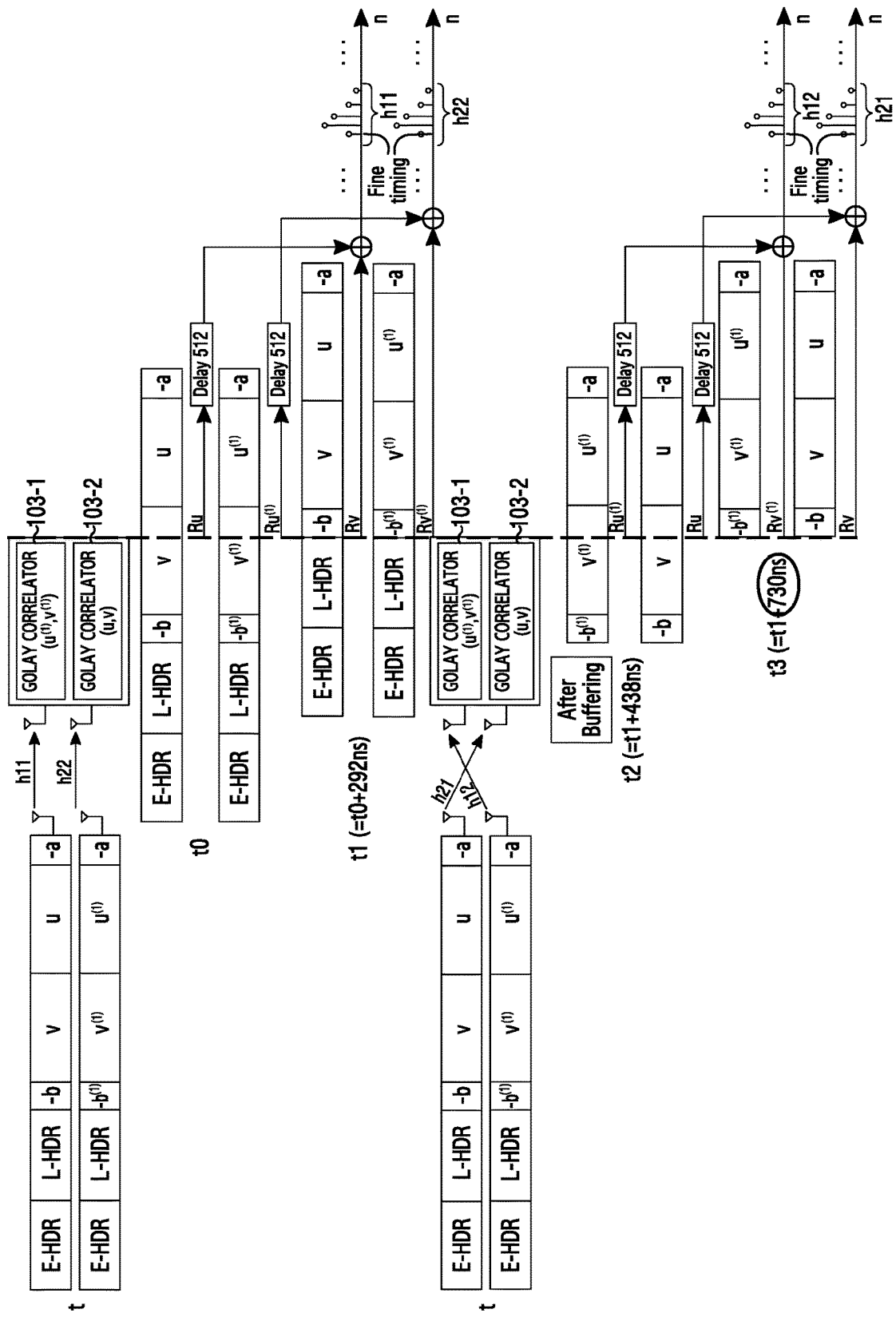
FIG. 13 illustrates a structure in which a reception apparatus estimates a channel using a single correlator for each antenna according to an exemplary embodiment of the present disclosure.

FIG. 13 illustrates the structure of a reception apparatus in which a single correlator is used for each antenna according to an exemplary embodiment of the present disclosure. FIG. 13 shows a case where a transmission apparatus 100 transmits a reference signal including a first CEF 800 via a first antenna and transmits a reference signal including a second CEF 810 via a second antenna. Further, it is assumed that the reception apparatus 102 includes a first receiving antenna and a second receiving antenna in a 2×2 MIMO system. However, the same structure of the reception apparatus 102 illustrated in FIG. 13 may be applied to a reception apparatus 102 supporting an N×N MIMO system or an N×M MIMO system.

Referring to FIG. 13, the reception apparatus 102 may include a first Golay correlator 103-1 and a second Golay correlator 103-2. Here, the first Golay correlator 103-1 may be configured using $G^{(1)}u512$ and $G^{(1)}v512$, and the second Golay correlator 103-2 may be configured using Gu512 and Gv512.

At time $t_0$, the reception apparatus 102 may provide a signal received via the first receiving antenna to the second Golay correlator 103-2 and may provide a signal received via the second receiving antenna to the first Golay correlator 103-1, thereby obtaining $R_u$ and $R_u^{(1)}$. $R_u$ and $R_u^{(1)}$ are similar to $R_{yt0u}$ and $R_{yt0u}^{(1)}$ illustrated in Equation 11. Here, it is assumed that the reception apparatus 102 can predict a channel measurement interval using $R_u$ and $R_u^{(1)}$ before time $t_0$. The reception apparatus 102 may delay obtained $R_u$ and $R_u^{(1)}$ for 292 ns. Here, 292 ns corresponds to 512 samples.

At time $t_1$ after 292 ns from time $t_0$, the reception apparatus 102 may provide a signal received via the first receiving antenna to the second Golay correlator 103-2 and may provide a signal received via the second receiving antenna to the first Golay correlator 103-1, thereby obtaining $R_v$ and $R_v^{(1)}$. $R_v$ and $R_v^{(1)}$ are similar to $R_yt_{1v}$ and $R_yt_{1v}^{(1)}$ illustrated in Equation 11.

The reception apparatus 102 may add $R_u$ obtained at time $t_0$ and $R_v$ obtained at time $t_1$ and may add $Ru^{(1)}$ obtained at time $t_0$ and $Rv^{(1)}$ obtained at time $t_1$, thereby obtaining $h_{11}$ and $h_{22}$.

The reception apparatus 102 may store, in a buffer, the signals received at time $t_0$ via the first receiving antenna and the second receiving antenna. At time $t_2$ after 438 ns from time $t_1$, the reception apparatus 102 provides the signal received via the first receiving antenna and stored in the buffer to the first Golay correlator 103-1 and provides the signal received via the second receiving antenna and stored in the buffer to the second Golay correlator 103-2. Accordingly, the reception apparatus 102 may obtain $R_u^{(1)}$ and $R_u$. Here, $Ru^{(1)}$ and Ru are similar to $R_{yt0u}^{(1)}$ and $R_{yt0u}$ illustrated in Equation 11. The reception apparatus 102 may delay obtained $R_u^{(1)}$ and $R_u$ for 292 ns. Here, 292 ns corresponds to 512 samples.

At time $t_3$ after 292 ns from time $t_2$, the reception apparatus 102 may provide a signal received via the first receiving antenna to the first Golay correlator 103-1 and may provide a signal received via the second receiving antenna to the second Golay correlator 103-2, thereby obtaining $R_v^{(1)}$ and $R_v$. Here, $Rv^{(1)}$ and $R_v$ are similar to $R_yt_{1v}^{(1)}$ and $R_yt_{1v}$ illustrated in Equation 11.

The reception apparatus 102 may add $R_u$ obtained at time $t_2$ and $R_v$ obtained at time $t_3$ and may add $R_u^{(1)}$ obtained at time $t_2$ and $R_v^{(1)}$ obtained at time $t_3$, thereby obtaining $h_21$ and $h_12$.

As described above, when one Golay correlator is included for each antenna, the reception apparatus 102 may buffer a received signal and may use the Golay correlator for each antenna in a shifted manner, thereby estimating an MIMO channel. However, when one Golay correlator is included for each antenna, the reception apparatus 102 may need a buffer to buffer a received signal for each antenna or a delay element.

Figure 14:
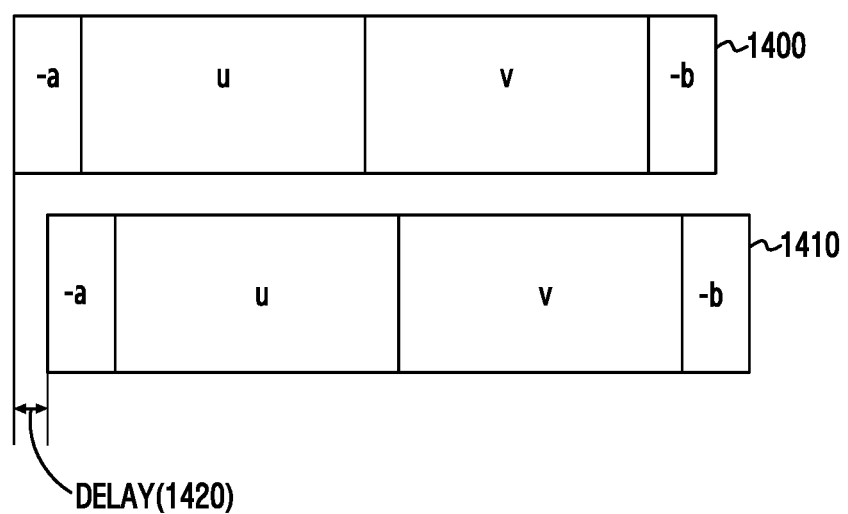
FIG. 14 illustrates the configuration of a transmission signal for channel estimation according to another exemplary embodiment of the present disclosure.

FIG. 14 illustrates the configuration of a transmission signal for channel estimation according to another exemplary embodiment of the present disclosure.

Referring to FIG. 14, a transmission apparatus 100 according to the exemplary embodiment of the present disclosure may generate two identical CEFs and may transmit the two identical CEFs via individual antennas at different times. For example, the transmission apparatus 100 may generate a first CEF 1400 and a second CEF 1410. The first CEF 1400 and the second CEF 1410 may include the same Golay sequence. That is, the first CEF 1400 may include −a, u, v, and −b like the CEF 300 of FIG. 3A, and the second CEF 1410 may also include −a, u, v, and −b like the CEF 300 of FIG. 3A. However, in the exemplary embodiment of the present disclosure, the transmission time of the second CEF 1410 is configured to be delayed by a predetermined time 1420 from the transmission time of the first CEF 1400. For example, the second CEF may be transmitted in a cyclic-shifter manner after the first CEF is transmitted. Here, the predetermined time 1420 may change according to the design method. For example, the predetermined time may be equal to or longer than 36.48 ns, which corresponds to 64 samples.

Figure 15:
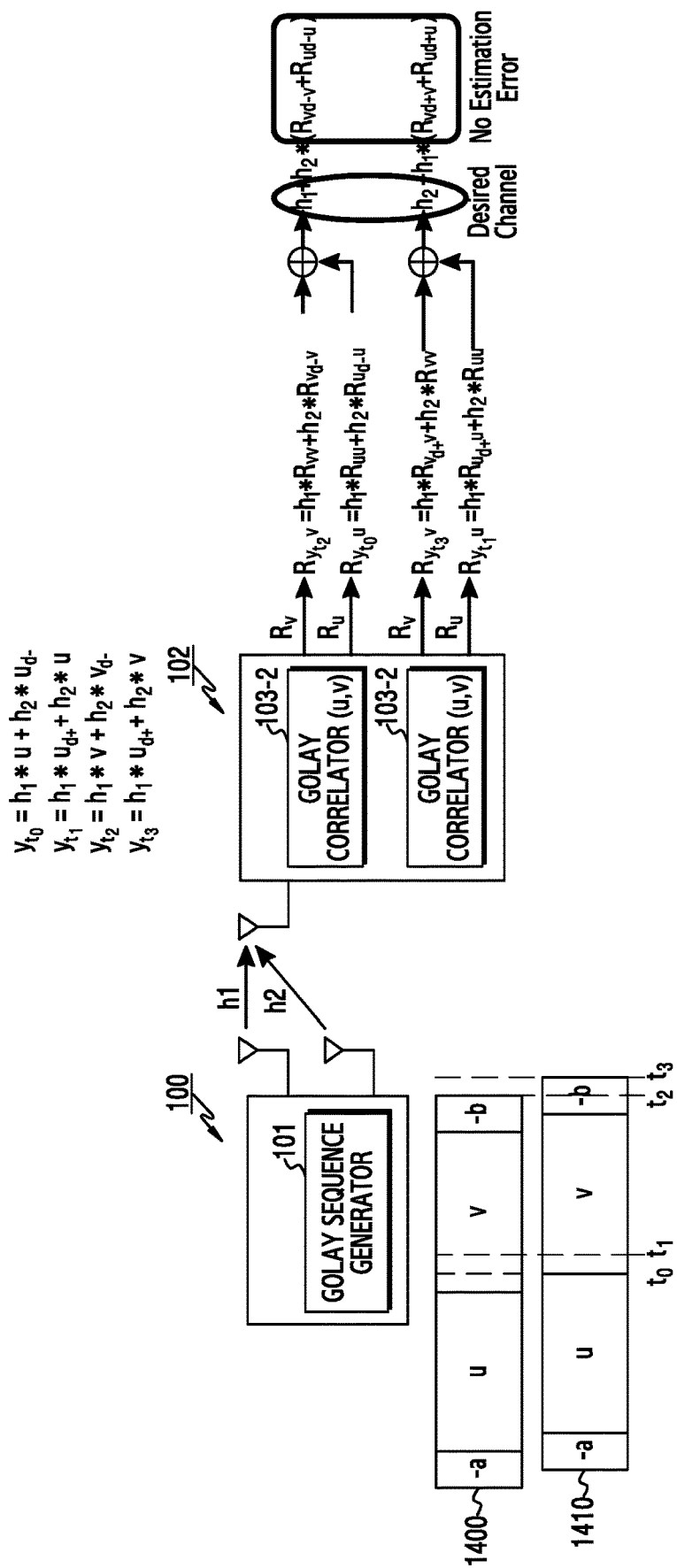
FIG. 15 illustrates an example of transmitting the CEFs of FIG. 14 according to an exemplary embodiment of the present disclosure.

FIG. 15 illustrates an example of transmitting the CEFs of FIG. 14 according to an exemplary embodiment of the present disclosure. Here, in FIG. 15, a 2×2 MIMO system is assumed, but only a first receiving antenna of a reception apparatus 102 is shown for convenience. However, a second receiving antenna of the reception apparatus 102 may also be configured in the same manner.

Referring to FIG. 15, a Golay sequence generator 101 of the transmission apparatus 100 generates a first CEF 1400 and a second CEF 1410, as illustrated in FIG. 14. The transmission apparatus 100 transmits the first CEF 1400 via a first transmitting antenna and transmits the second CEF 1410 via a second transmitting antenna. Here, the transmission apparatus 100 controls the second CEF 1410 to be transmitted at a time delayed by a predetermined time (for example, 36.48 ns) from the transmission time of the first CEF 1400. The first CEF 1400 and the second CEF 1410 transmitted from the transmission apparatus 100 pass through a channel $h_1$ and a channel $h_2$ and are received by the first receiving antenna of the reception apparatus 102. The signals received by the reception apparatus 102 may be represented by Equation 13.

$$y_{t_0} = h_1 * u + h_2 * u_{d-}$$

$$y_{t_1} = h_1 * u_{d+} + h_2 * u$$

$$y_{t_2} = h_1 * v + h_2 * v_{d-}$$

$$y_{t_3} = h_1 * v_{d+} + h_2 * v \qquad \text{Equation 13}$$

Here, $yt_0$ denotes a signal received at time $t_0$, $yt_2$ denotes a signal received at time $t_2$, $yt_1$ denotes a signal received at time $t_1$, and $yt_3$ denotes a signal received at time $t_3$. Further, $u_{d-}$ and $v_{d-}$ respectively denote signals u and v delayed by a predetermined time (for example, 36.48 ns), and $u_{d+}$ and $v_+$ respectively denote signals u and v transmitted by the predetermined time before. For example, ud− may indicate that a Golay sequence u is received with a delay of a predetermined time from a corresponding time, and ud+ may indicate that a Golay sequence u is received by a predetermined time before the corresponding time. $h_1$ denotes a channel between the first transmitting antenna of the transmission apparatus 100 and the first receiving antenna of the reception apparatus 102, and $h_2$ denotes a channel between the second transmitting antenna of the transmission apparatus 100 and the first receiving antenna of the reception apparatus 102. u denotes Gu512, and v denotes Gv512.

The reception apparatus 102 may input the received signal represented by Equation 13 to a first Golay correlator 103-2 and a second Golay correlator 103-2, thereby obtaining a signal represented by Equation 14. The first Golay correlator 103-2 may include Gu512 and Gv512, and the second Golay correlator 103-2 may also include Gu512 and Gv512. That is, the reception apparatus 102 includes two identical Golay correlators 103-2, but the two Golay correlators 103-2 are referred to as a first Golay correlator 103-2 and a second Golay correlator 103-2, respectively, for convenience of explanation.

$$R_{y_{t_0}u} = h_1 * R_{uu} + h_2 * R_{u_{d-}u}$$

$$R_{y_{t_1}u} = h_1 * R_{u_{d+}u} + h_2 * R_{uu}$$

$$R_{y_{t_2}v} = h_1 * R_{vv} + h_2 * R_{v_{d-}v}$$

$$R_{y_{t_3}v} = h_1 * R_{v_{d+}v} + h_2 * R_{vv} \qquad \text{Equation 14}$$

Here, $R_{yt0u}$ denotes a signal obtained by inputting a signal $yt_0$ received at time $t_0$ into the first Golay correlator 103-2, and $R_{yt1u}$ denotes a signal obtained by inputting a signal $y_{t1}$ received at time $t_1$ into the second Golay correlator 103-2. Further, $R_{yt2v}$ denotes a signal obtained by inputting a signal $yt_2$ received at time $t_2$ into the first Golay correlator 103-2, and $R_{yt3v}$ denotes a signal obtained by inputting a signal $yt_3$ received at time $t_3$ into the second Golay correlator 103-2.

The reception apparatus 102 may add $R_{yt0u}$ and $R_{yt2v}$ and may add $R_{yt1u}$ and $R_{yt3v}$, thereby estimating channels $h_1$ and $h_2$ according to Equation 15.

$$h_1 + h_2 * (R_{v_{d-}v} + R_{u_{d-}u})$$

$$h_2 + h_1 * (R_{v_{d+}v} + R_{u_{d+}u}) \qquad \text{Equation 15}$$

Here, $R_{vd-v}$, $R_{ud-u}$, $R_{vd+v}$, and $R_{ud+u}$ are 0 in a channel measurement interval. The channel measurement interval may include 63 samples. Therefore, when the reception apparatus 102 estimates the channel $h_1$ and $h_2$ according to Equation 15, no channel estimation error occurs. Here, $R_{vd-v}$, $R_{ud-u}$, $R_{vd+v}$, and $R_{ud+u}$ are 0 in the channel measurement interval 1000, because neighbors of a correlation peak are 0 due to the periodic characteristics of the Golay sequences u and v.

Figure 16:
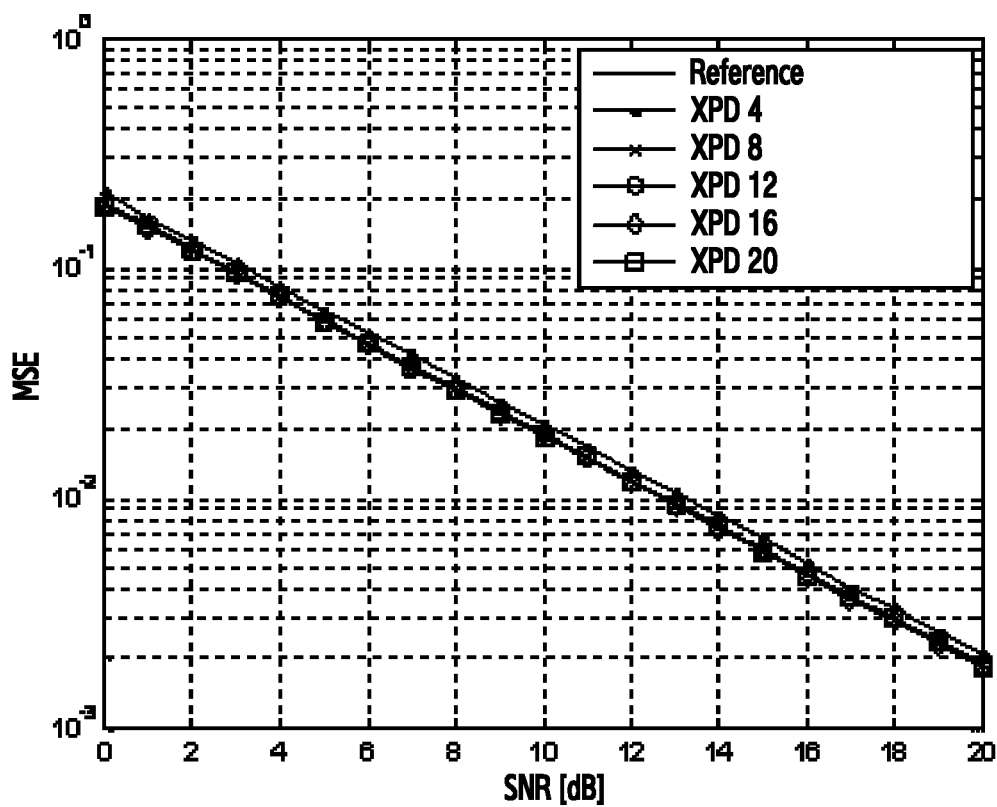
FIG. 16 shows a graph illustrating a channel estimation error in the CEF transmission/reception scheme of FIG. 15.

FIG. 16 shows a graph illustrating a channel estimation error in the CEF transmission/reception scheme of FIG. 15. FIG. 16 shows the MSE according to SNR. In FIG. 16, Reference shows optimal performance. Further, XPD n (in dB, where n is 4, 8, 12, 16, and 20) denotes the ratio of the size of $h_1$ to the size of $h_2$. FIG. 16 shows that MSE performance is similar to the performance of Reference regardless of the XPD value. Although there is a slight difference between the MSE value of XPD 4 and the performance of Reference, the desired strength of a signal at the same SNR is reduced due to interference, and thus the MSE difference between XPD and Reference is not regarded as performance deterioration.

The CEF transmission/reception schemes for a 2×2 MIMO system have been illustrated in the foregoing description. Hereinafter, a CEF transmission/reception scheme for a 4×4 MIMO system will be described with reference to examples.

Figure 17A:
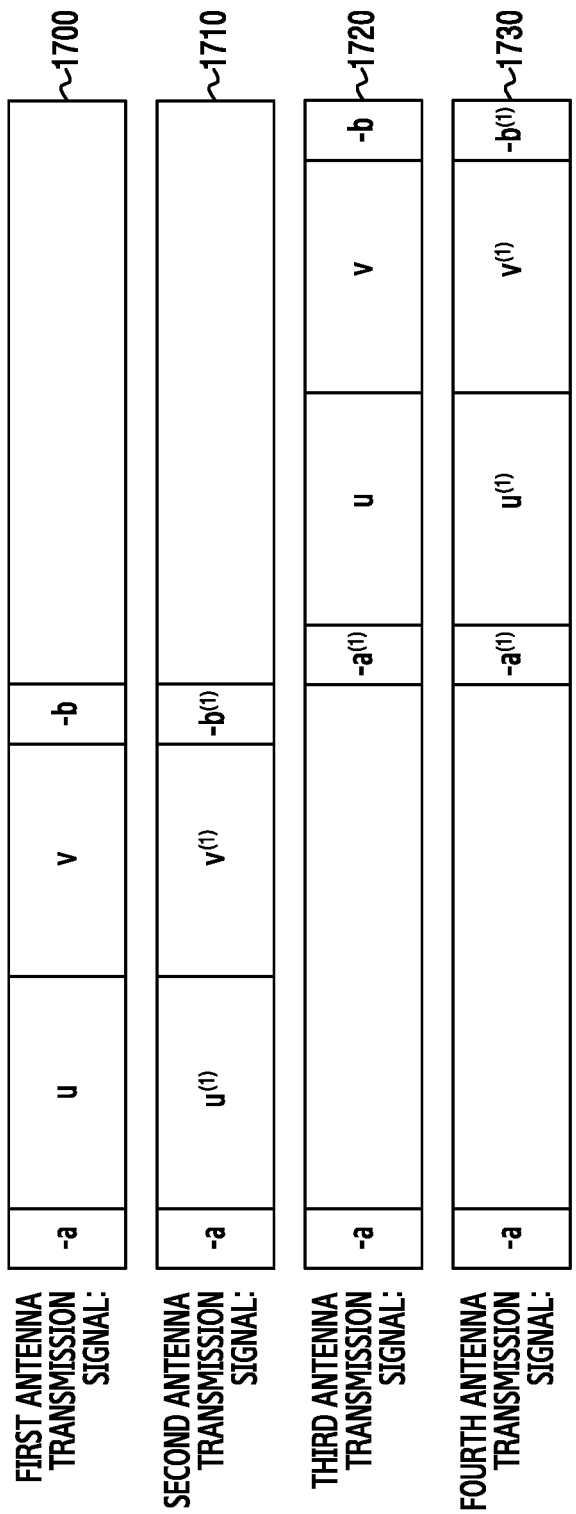
Figure 17B:
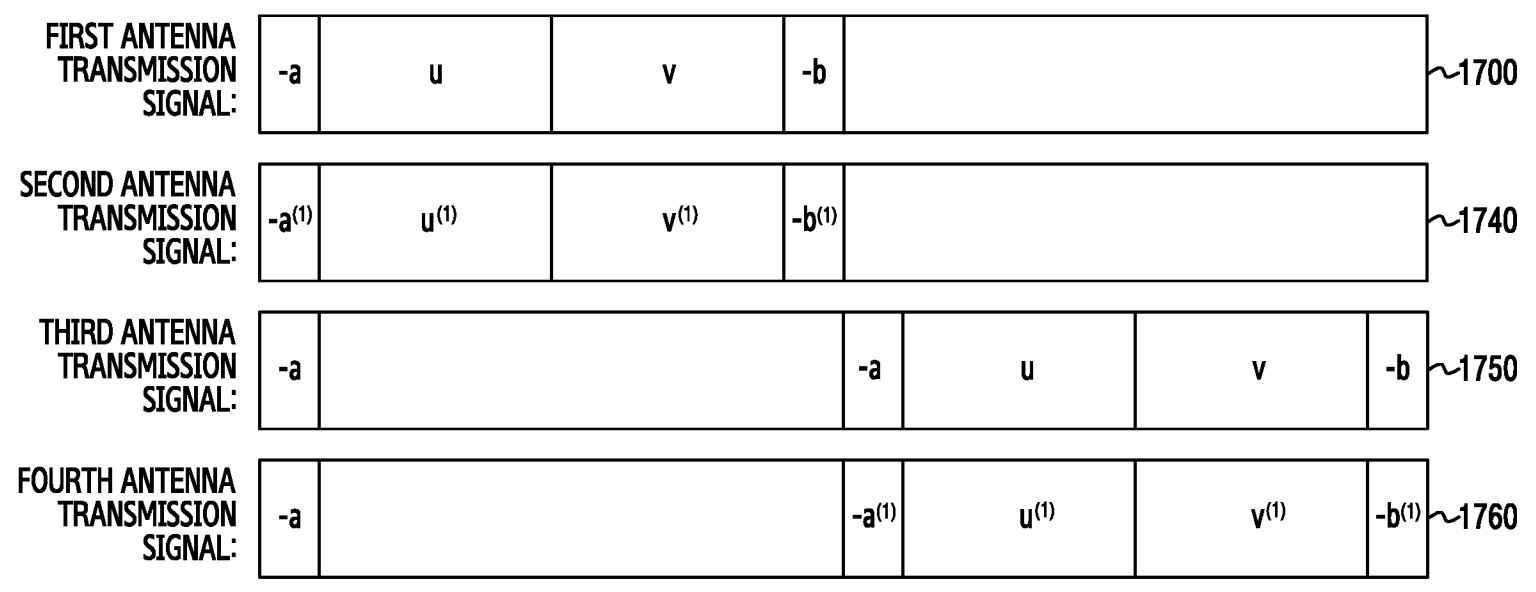

FIGS. 17A and 17B illustrate the configuration of a transmission signal for channel estimation according to various exemplary embodiments of the present disclosure.

Referring to FIGS. 17A and 17B, a transmission apparatus 100 according to the exemplary embodiment of the present disclosure may generate four different CEFs and may transmit each CEF via each antenna. For example, the transmission apparatus 100 may generate a first CEF 1700, a second CEF 1710, a third CEF 1720, and a fourth CEF 1730 as illustrated in FIG. 17A, or may generate a first CEF 1700, a second CEF 1740, a third CEF 1750, and a fourth CEF 1760 as illustrated in FIG. 17B. For example, according to the channel measurement interval prediction method, the transmission apparatus 100 may generate the first to fourth CEFs as illustrated in FIG. 17A or may generate the first to fourth CEFs as illustrated in FIG. 17B. Here, the CEFs of FIGS. 17A and 17B may be divided into a first section and a second section. The CEFs of FIGS. 17A and 17B are configured such that a Golay sequence is transmitted through one of the first section and the second section.

Referring to FIG. 17A, a first section of the first CEF 1700 may include −a, u, v, and −b like the first CEF 800 of FIG. 8A, and a second section thereof includes no Golay sequence. A first section of the second CEF 1710 may include −a, $u^{(1)}$, $v^{(1)}$, and $-b^{(1)}$ like the second CEF 810 of FIG. 8A, and a second section thereof includes no Golay sequence. A first section of the third CEF 1720 may include only −a at the head for synchronization, and a second section thereof may include $-a^{(1)}$, u, v, and −b. Here, the second section of the third CEF 1720 starts with $-a^{(1)}$ to be distinguished from the first section of the first CEF 1700. A first section of the fourth CEF 1730 may include only −a at the head for synchronization, and a second section thereof may include −a$^{(1)}$, u$^{(1)}$, v$^{(1)}$, and −b$^{(1)}$. Here, the second section of the fourth CEF 1730 starts with −a$^{(1)}$ to be distinguished from the first section of the second CEF 1710.

Referring to FIG. 17B, a first section of the first CEF 1700 may include −a, u, v, and −b like the first CEF 800 of FIG. 8A, and a second section thereof includes no Golay sequence. A first section of the second CEF 1740 may include −a$^{(1)}$, u$^{(1)}$, v$^{(1)}$, and −b$^{(1)}$ like the second CEF 810 of FIG. 8B, and a second section thereof includes no Golay sequence. A first section of the third CEF 1750 may include only −a at the head for synchronization, and a second section thereof may include −a, u, v, and −b like the first section of the first CEF 1700. A first section of the fourth CEF 1760 may include only −a at the head for synchronization, and a second section thereof may include −a$^{(1)}$, u$^{(1)}$, v$^{(1)}$, and −b$^{(1)}$ like the first section of the second CEF 1740.

Referring to FIGS. 17A and 17B, a first antenna of transmission apparatus 100 transmits the first CEFs 1700, and a second antenna transmits the second CEFs 1710 and 1740. Since the first CEFs 1700 and the second CEFs 1710 and 1740 include a Golay sequence only in the first section, the first antenna and the second antenna transmit a signal only during the first section and do not transmit a signal during the second section.

A third antenna of the transmission apparatus 100 transmits the third CEFs 1720 and 1750, and a fourth antenna transmits the fourth CEFs 1730 and 1760. The third CEFs 1720 and 1750 and the fourth CEFs 1730 and 1760 include a Golay sequence −a at the beginning in the first section and include a Golay sequence in the second section. Therefore, while the signals of the first sections are transmitted through the first antenna and the second antenna, the third antenna and the fourth antenna of the transmission apparatus 100 transmit only −a at the beginning and do not transmit any more signals until the first sections terminate. The third antenna and the fourth antenna of the transmission apparatus 100 transmit signals during the second sections in which the first antenna and the second antenna do not transmit any signal.

Therefore, the transmission signals of the first antenna and the second antenna do not interfere in the transmission signals of the third antenna and the fourth antenna, and the transmission signals of the third antenna and the fourth antenna do not interfere in the transmission signals of the first antenna and the second antenna. In this case, a reception apparatus 102 may first receive the transmission signals from the first antenna and the second antenna of the transmission apparatus 100 and may estimate a channel in the same manner as the CEF reception schemes illustrated in FIGS. 9 and 13. Then, the reception apparatus 102 may receive the transmission signals from the third antenna and the fourth antenna and may estimate a channel in the same manner as the CEF reception schemes illustrated in FIGS. 9 and 13.

Figure 18:
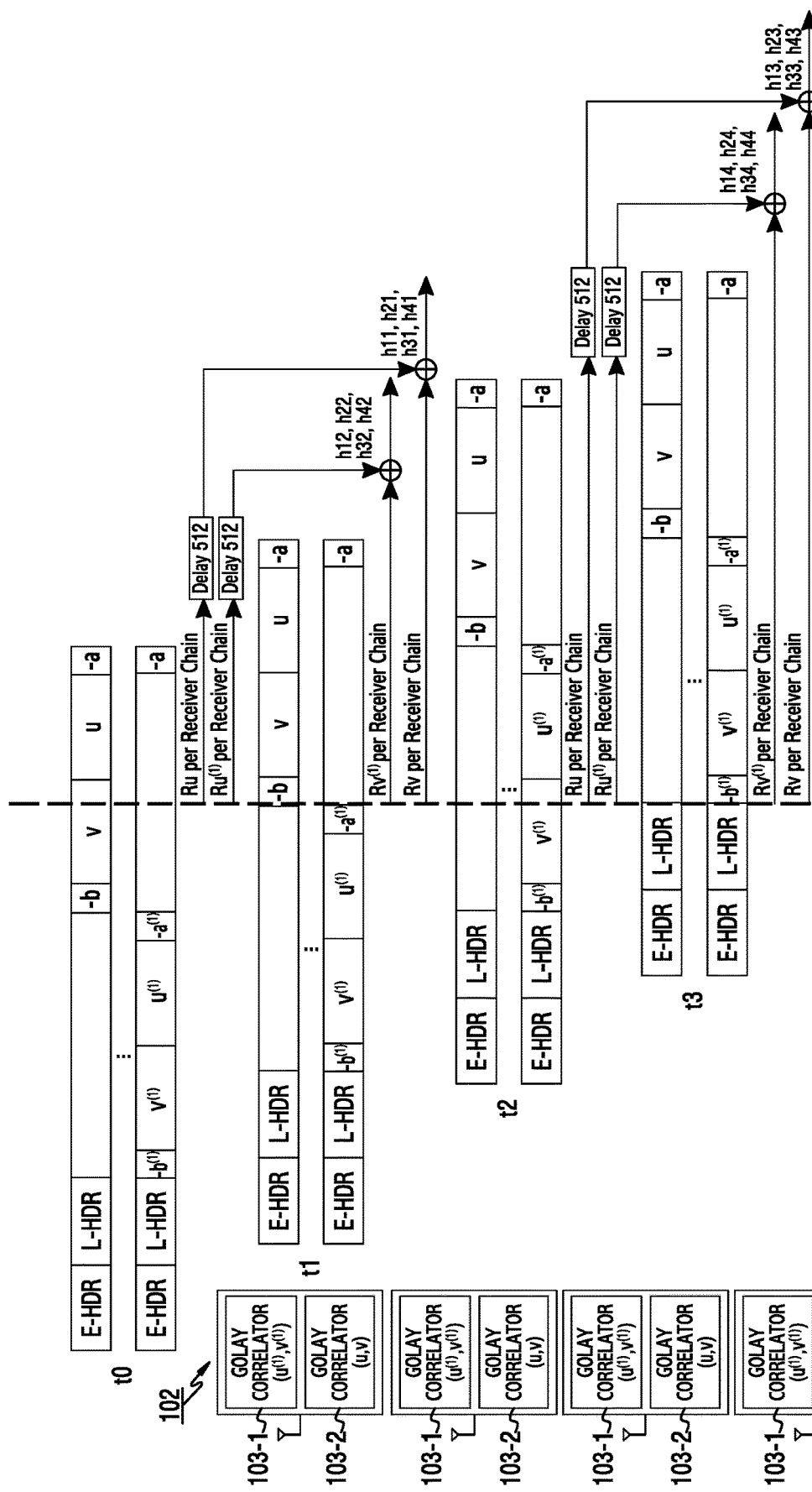
FIG. 18 illustrates the structure of a reception apparatus that receives the CEF signal of FIG. 17A and estimates a channel.

FIG. 18 illustrates the structure of a reception apparatus that receives the CEF signal of FIG. 17A and estimates a channel. FIG. 18 shows the structure of the reception apparatus 102 for estimating a channel when two Golay correlators 103-1 and 103-2 are included for each receiving antenna.

Referring to FIG. 18, the reception apparatus 102 may include a first Golay correlator 103-1 and a second Golay correlator 103-2 for each receiving antenna. Here, the first Golay correlator 103-1 may be configured with G$^{(1)}$u512 and G$^{(1)}$v512, and the second Golay correlator 103-2 may be configured with Gu512 and Gv512. With this structure, the reception apparatus 102 may obtain $R_u$ and $R_u^{(1)}$ at time $t_0$ and may obtain $R_v$ and $R_v^{(1)}$ at time $t_1$ after 292 ns from time $t_0$, using a signal received from an i-th antenna. The reception apparatus 102 may add $R_u$ obtained at time $t_0$ and Rv obtained at time $t_1$ and may add $R_u^{(1)}$ obtained at time $t_0$ and $R_v^{(1)}$ obtained at time $t_1$, thereby estimating channels $h_{i1}$ and $h_{i2}$. Here, it is assumed that the reception apparatus 102 can predict a channel measurement interval using $R_u$ and $R_u^{(1)}$ before time $t_0$. Further, the reception apparatus 102 may obtain $R_u$ and $R_u^{(1)}$ at time $t_2$ ($t_2=t_1+438$ ns) and may obtain $R_v$ and $R_v^{(1)}$ at time $t_3$ after 292 ns from time $t_2$, using a signal received from the i-th antenna. The reception apparatus 102 may add $R_u$ obtained at time $t_2$ and $R_v$ obtained at time $t_3$ and may add $R_u^{(1)}$ obtained at time $t_2$ and $R_v^{(1)}$ obtained at time $t_3$, thereby estimating channels hi3 and hi4.

Figure 19:
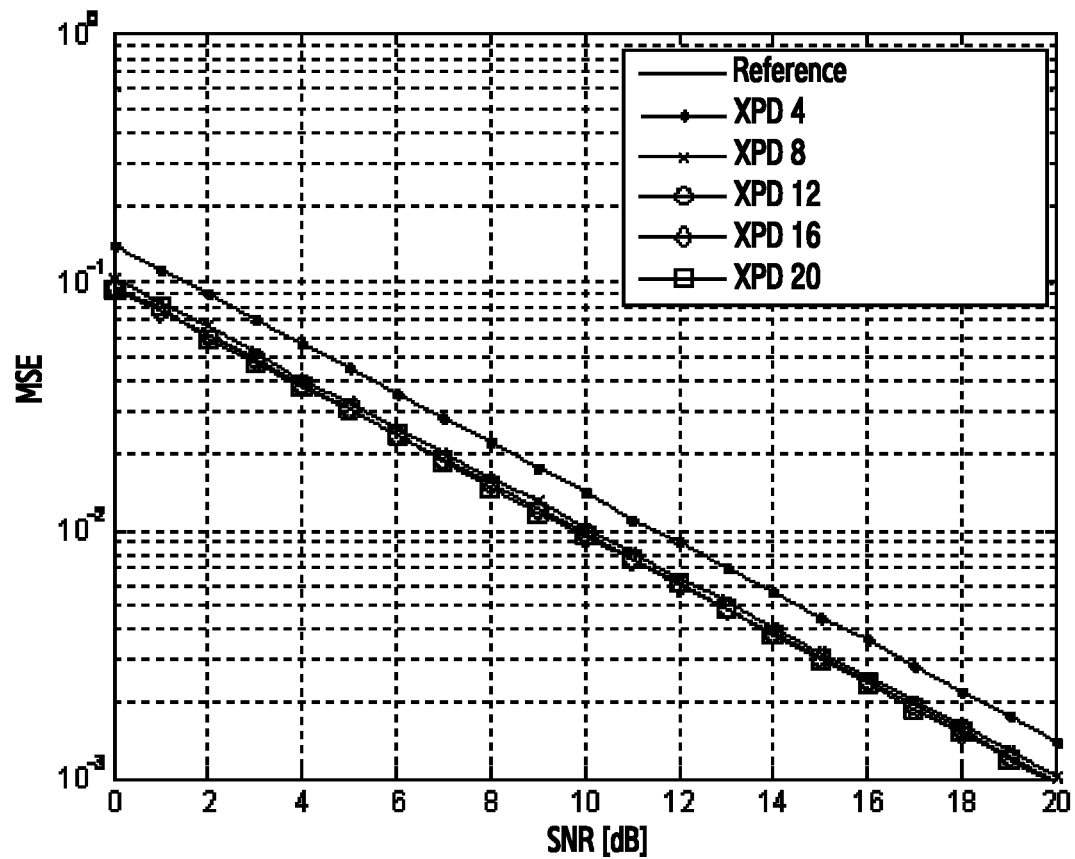
FIG. 19 shows a graph illustrating a channel estimation error in the CEF transmission/reception scheme of FIG. 18.

FIG. 19 shows a graph illustrating a channel estimation error in the CEF transmission/reception scheme of FIG. 18. FIG. 19 shows the MSE according to SNR. In FIG. 19, Reference shows optimal performance. Further, XPD n (in dB, where n is 4, 8, 12, 16, and 20) denotes the ratio of the size of $h_1$ to the size of $h_2$. FIG. 19 shows that MSE performance of XPDs other than XPD 4 is similar to that of Reference. Although the MSE performance of XPD 4 is about 1.5 dB lower than that of Reference, the desired strength of a signal at the same SNR is reduced due to interference, and thus the MSE difference between XPD 4 and Reference is not regarded as performance deterioration.

Figure 20A:
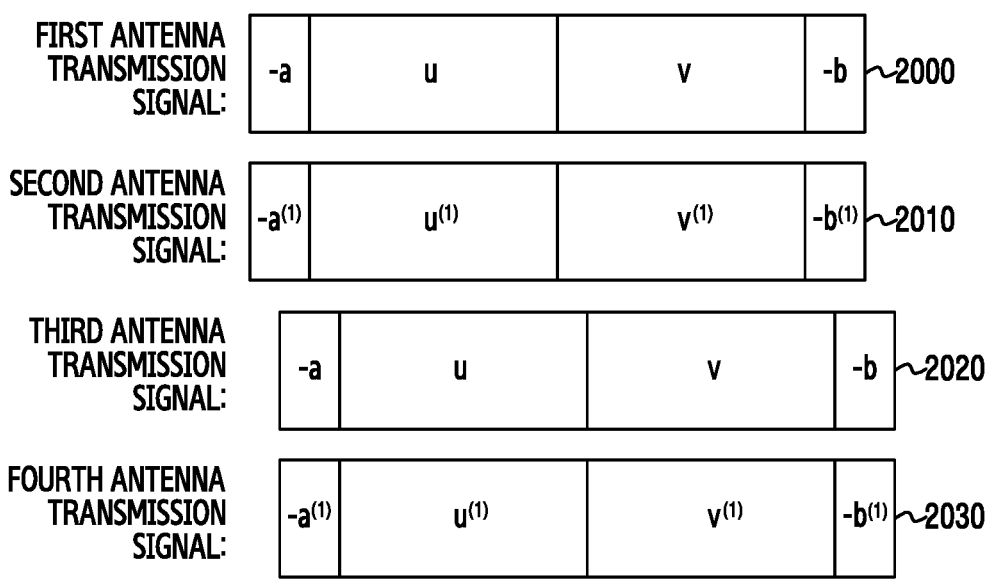
FIGS. 20A and 20B illustrate the configuration of a transmission signal for channel estimation according to various exemplary embodiments of the present disclosure.
Figure 20B:
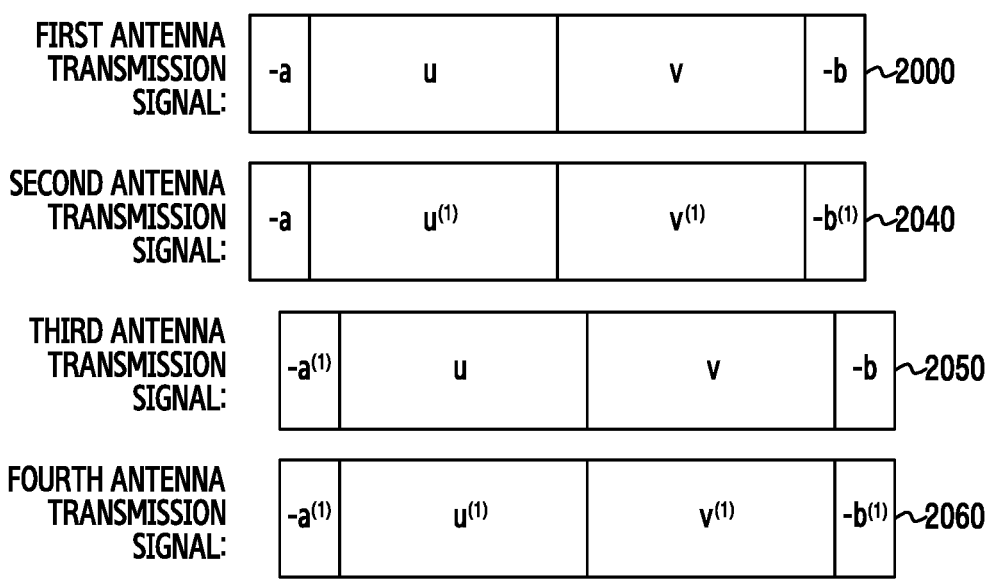

FIGS. 20A and 20B illustrate the configuration of a transmission signal for channel estimation according to various exemplary embodiments of the present disclosure. Here, a method of using the transmission signal configuration method of FIG. 8 and the transmission signal configuration method of FIG. 14 together for a 4×4 MIMO system is shown.

Referring to FIGS. 20A and 20B, a transmission apparatus 100 according to the exemplary embodiment of the present disclosure may generate at least two different CEFs and may transmit each CEF via each antenna. For example, the transmission apparatus 100 may generate and transmit a first CEF 2000 to a fourth CEF 2030 as illustrated in FIG. 20A, or may generate and transmit a first CEF 2000 to a fourth CEF 2060 as illustrated in FIG. 20B. For example, according to the channel measurement interval prediction method, the first to fourth CEFs may be used as illustrated in FIG. 20A, or the first to fourth CEFs may be used as illustrated in FIG. 20B.

Referring to FIG. 20A, the first CEF 2000 may include −a, u, v, and −b, like the first CEF 800 of FIG. 8B, and the second CEF 2010 may include −a$^{(1)}$, u$^{(1)}$, v$^{(1)}$, and −b$^{(1)}$, like the second CEF 820 of FIG. 8B. Further, the third CEF 2020 may be configured the same as the first CEF 2000, and the fourth CEF may be configured the same as the second CEF 2010. Here, the transmission time of the third CEF 2020 and the fourth CEF 2030 may be configured to be delayed by a predetermined time (for example, 36.48 ns) from the transmission time of the first CEF 2000 and the second CEF 2010. Here, the predetermined time may change according to the design method.

Referring to FIG. 20B, the first CEF 2000 may include −a, u, v, and −b, like the first CEF 800 of FIG. 8A, and the second CEF 2040 may include −a, u$^{(1)}$, v$^{(1)}$, and −b$^{(1)}$, like the second CEF 810 of FIG. 8A. Further, the third CEF 2050 may include −a$^{(1)}$, u, v, and −b, and the fourth CEF may be configured the same as the second CEF 820 of FIG. 8B. Here, the transmission time of the third CEF 2050 and the fourth CEF 2060 may be configured to be delayed by a predetermined time (for example, 36.48 ns) from the transmission time of the first CEF 2000 and the second CEF 2040. Here, the predetermined time may change according to the design method.

Referring to FIGS. 20A and 20B, the transmission apparatus 100 may transmit the first CEFs 2000 and the second CEFs 2010 and 2040 respectively through a first antenna and a second antenna at a first time, and may transmit the third CEFs 2020 and 2050 and the fourth CEFs 2030 and 2060 respectively through a third antenna and a fourth antenna at a second time after a predetermined time (for example, 36.48 ns) from the first time. According to various exemplary embodiments of the present disclosure, the transmission apparatus 100 may transmit transmission signals of the second antenna and the fourth antenna with respective delays of 36.48 ns and 72.96 ns or shorter in order to improve overall frame performance.

Figure 21:
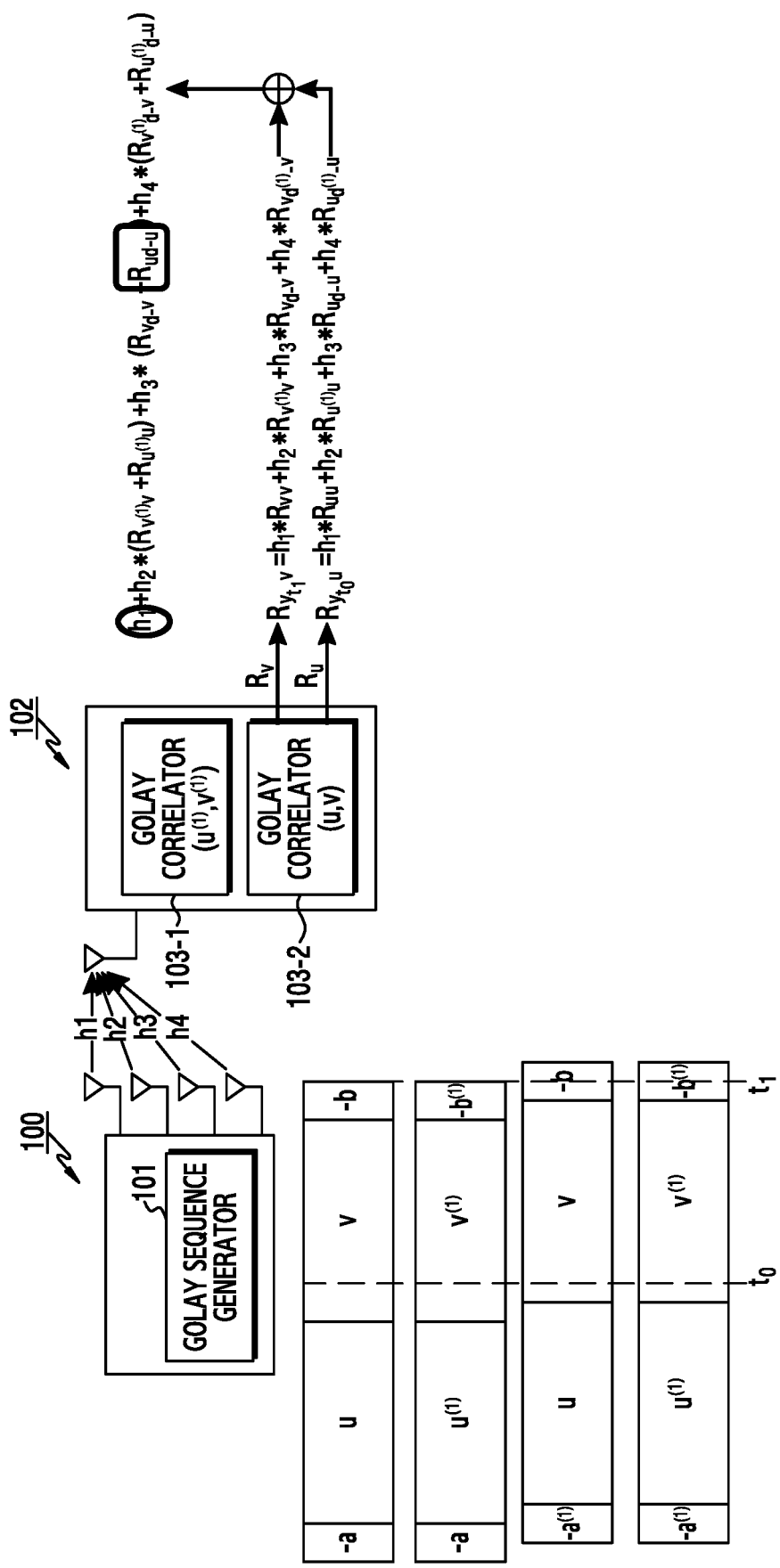
FIG. 21 illustrates an example of transmitting the CEFs of FIG. 20B according to various exemplary embodiments of the present disclosure.

FIG. 21 illustrates an example of transmitting the CEFs of FIG. 20B according to various exemplary embodiments of the present disclosure. Here, in FIG. 21, a 4×4 MIMO system is assumed, but only a first receiving antenna of a reception apparatus 102 is shown for convenience. However, a second receiving antenna, a third receiving antenna, and/or a fourth receiving antenna of the reception apparatus 102 may also be configured in the same manner. Although FIG. 21 illustrates a case of transmitting and receiving the first CEF to the fourth CEF in FIG. 20B, the first CEF to the fourth CEF of FIG. 20A may be transmitted and received in the same manner.

Referring to FIG. 21, a Golay sequence generator 101 of a transmission apparatus 100 generates a first CEF 2000, a second CEF 2040, a third CEF 2050, and a fourth CEF 2060, as illustrated in FIG. 20B. The transmission apparatus 100 transmits the first CEF 2000 via a first transmitting antenna and transmits the second CEF 2040 via a second transmitting antenna at a first time. Then, the transmission apparatus 100 transmits the third CEF 2050 via the third transmitting antenna and transmits the fourth CEF 2060 via a fourth transmitting antenna at a second time after a predetermined time from the first time.

The first CEF 2000, the second CEF 2040, the third CEF 2050, and the fourth CEF 2060 transmitted from the transmission apparatus 100 pass through channels $h_1$, $h_2$, $h_3$, and $h_4$, respectively, and are received by the first receiving antenna of the reception apparatus 102. The reception apparatus 102 may input the signals received at time $t_0$ and time $t_1$ to a first Golay correlator 103-1 and a second Golay correlator 103-2, thereby obtaining a signal represented by Equation 16. The first Golay correlator 103-1 may include $G^{(1)}u512$ and $G^{(1)}v512$, and the second Golay correlator 103-2 may include Gu512 and Gv512.

$$R_{y_{t_1}v} = h_1 * R_{vv} + h_2 * R_{v^{(1)}v} + h_3 * R_{v_{d-}v} + h_4 * R_{v_{d-}^{(1)}v} \quad \text{Equation 16}$$

$$R_{y_{t_0}u} = h_1 * R_{uu} + h_2 * R_{u^{(1)}u} + h_3 * R_{u_{d-}u} + h_4 * R_{u_{d-}^{(1)}u}$$

The reception apparatus 102 may add $R_{y_{t_0}u}$ and $Ry_{t_1}v$, thereby estimating a channel $h_1$ according to Equation 17.

$$h_1 + h_2 * (R_{v^{(1)}v} + R_{u^{(1)}u}) + \quad \text{Equation 17}$$
$$h_3 * (R_{v_{d-}v} + R_{u_{d-}u}) + h_4 * (R_{v_{d-}^{(1)}v} + R_{u_{d-}^{(1)}u})$$

Here, among all reference components illustrated in Equation 17, reference components other than Rud–u are 0 in a channel measurement interval. For example, $Rv^{(1)}v$, $Ru^{(1)}u$, Rvd–v, Rvd–$^{(1)}$v, and Rud–$^{(1)}$u are 0 in the channel measurement interval. The channel measurement interval may include 63 samples. Here, Rud–u is not 0, because the periodic characteristics of the Golay sequences in the CEFs of FIG. 20B are broken. Therefore, when the reception apparatus 102 estimates a channel, a channel estimation error may occur due to Rud–u.

Figure 22:
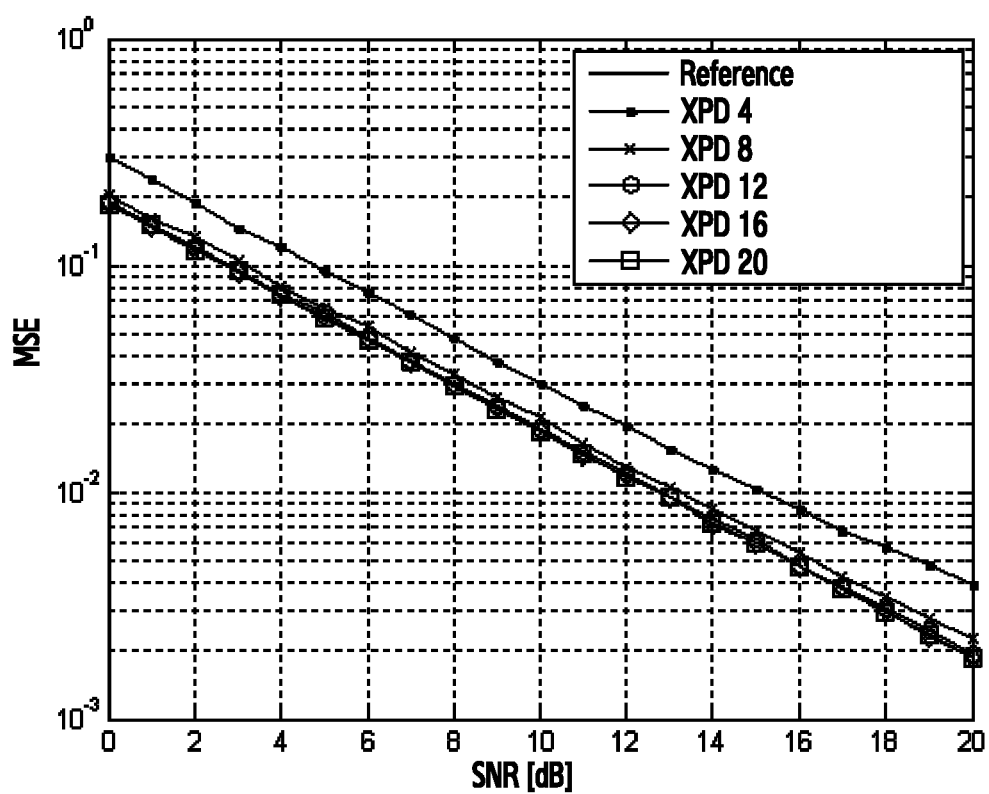
FIG. 22 shows a graph illustrating a channel estimation error in the CEF transmission/reception scheme of FIG. 21.

FIG. 22 shows a graph illustrating a channel estimation error in the CEF transmission/reception scheme of FIG. 21. FIG. 22 shows the MSE according to SNR. In FIG. 22, Reference shows optimal performance. Further, XPD n (in dB, where n is 4, 8, 12, 16, and 20) denotes the ratio of the size of $h_1$ to the size of $h_2$. FIG. 22 shows that MSE performance of XPD 4 is slightly lower than that MSE performance of XPD 4 in FIG. 19. However, the MSE performance of cases other than XPD 4 is similar to the performance of Reference.

FIGS. 21 and 22 illustrate a channel estimation error that may occur in the transmission and reception of the CEFs of FIG. 20B. According to various exemplary embodiments of the present disclosure, when the transmission apparatus 100 transmits the CEFs of FIG. 20A, the reception apparatus 102 may estimate a channel without any channel estimation error, which is because the periodic characteristics of the Golay sequences in the CEFs of FIG. 20A are not broken, and all interference components are 0 in the channel measurement interval. Therefore, when the transmission apparatus 100 transmits the CEFs of FIG. 20A, a channel estimation error may be represented as illustrated in FIG. 19.

Figure 23:
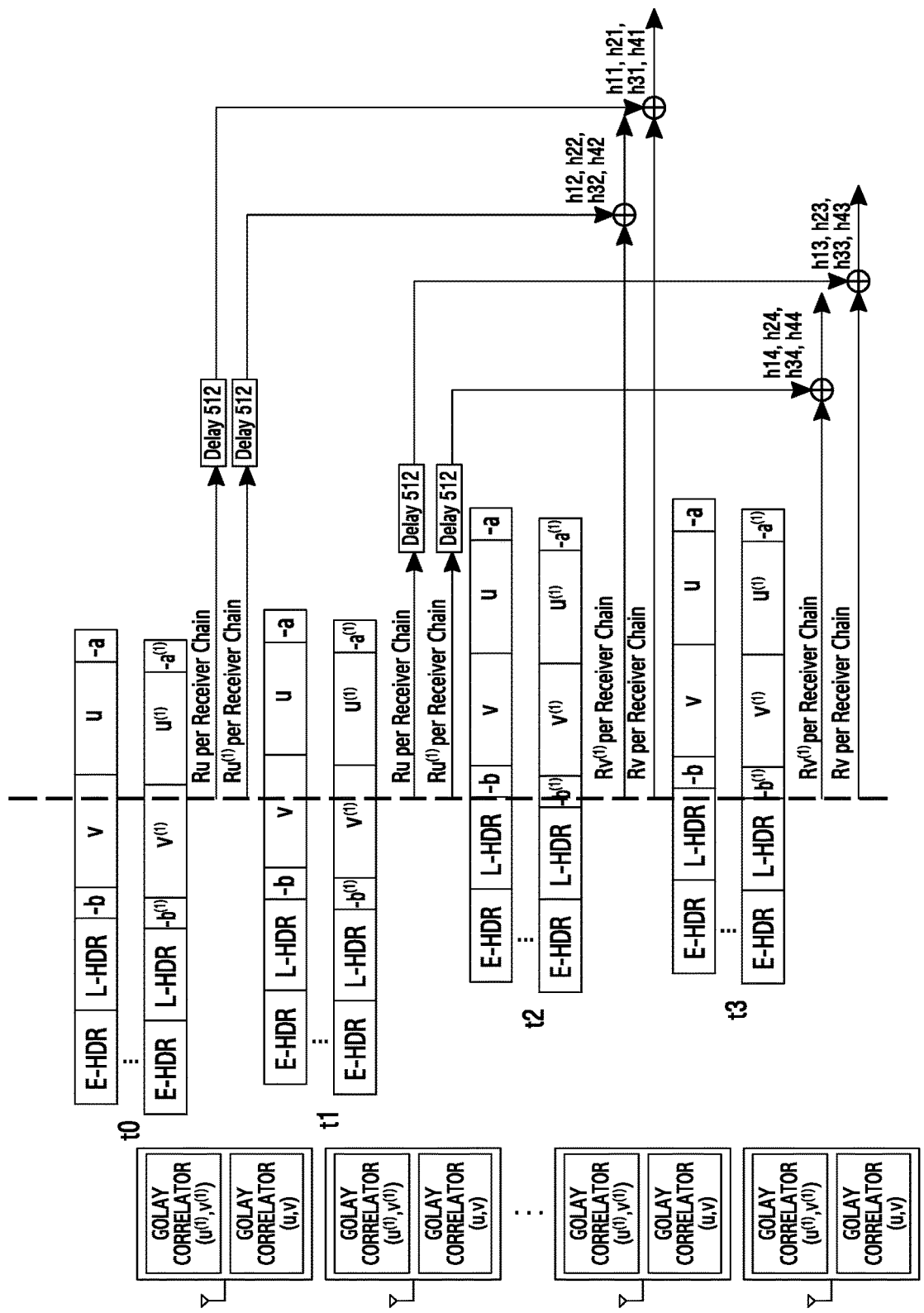
FIG. 23 illustrates the structure of a reception apparatus that receives the CEFs in FIG. 20A or FIG. 20B and estimates a channel.

FIG. 23 illustrates the structure of a reception apparatus that receives the CEFs in FIG. 20A or FIG. 20B and estimates a channel.

FIG. 23 shows the structure of the reception apparatus 102 for estimating a channel when four Golay correlators are included for each receiving antenna.

Referring to FIG. 23, the reception apparatus 102 may include, for each receiving antenna, two Golay correlators using $G^{(1)}u512$ and $G^{(1)}v512$ and two Golay correlators using Gu512 and Gv512. With this structure, the reception apparatus 102 may obtain $R_u$ and $R_u^{(1)}$ at time $t_0$ and may obtain Ru and Ru$^{(1)}$ at time $t_1$ after 36.48 ns from time $t_0$, using a signal received from an i-th antenna. Here, it is assumed that the reception apparatus 102 can predict a channel measurement interval using $R_u$ and $R_u^{(1)}$ before time $t_0$. Subsequently, the reception apparatus 102 may obtain $R_v$ and $R_v^{(1)}$ at time $t_2$ after 292 ns from time $t_0$ and may obtain $R_v$ and $R_v^{(1)}$ at time $t_3$ after 292 ns from time $t_1$. The reception apparatus 102 may add $R_u$ obtained at time $t_0$ and $R_v$ obtained at time $t_2$ and may add $R_u^{(1)}$ obtained at time $t_0$ and $R_v^{(1)}$ obtained at time $t_2$, thereby estimating channels hi1 and hi2. Further, the reception apparatus 102 may add $R_u$ obtained at time $t_1$ and $R_v$ obtained at time $t_3$ and may add $R_u^{(1)}$ obtained at time $t_1$ and $Rv^{(1)}$ obtained at time $t_3$, thereby estimating channels $h_{i3}$ and $h_{i4}$.

Figure 24:
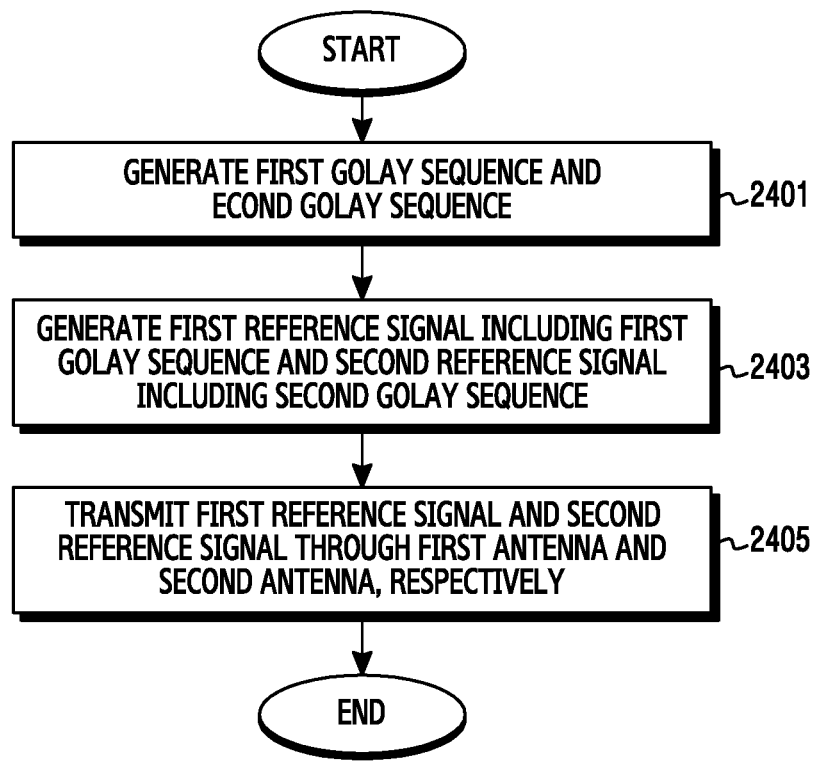
FIG. 24 illustrates the operation procedure of a transmission apparatus according to an exemplary embodiment of the present disclosure.

FIG. 24 illustrates the operation procedure of a transmission apparatus according to an exemplary embodiment of the present disclosure. Here, for convenience of explanation, it is assumed that a 2×2 MIMO system is supported. However, the following operation may be applied to an N×N MIMO system in the same manner. In addition, the order of the operations described below is provided only for illustration and does not limit the present disclosure. For example, the order of operations described below may be changed depending on the design.

Referring to FIG. 24, the transmission apparatus 100 may generate a first Golay sequence and a second Golay sequence in operation 2401. For example, the transmission apparatus 100 may generate the first Golay sequence based on a first seed and the second Golay sequence based on a second seed. More specifically, the transmission apparatus 100 may generate the first Golay sequence by applying Dn and Wn represented by Equation 2 to Equation 1 using Dn and Wn as seeds. Further, the transmission apparatus 100 may generate the second Golay sequence by applying Dn and Wn represented by Equation 9 to Equation 1. Here, the first Golay sequence may include at least one of $Ga_{128}(k)$, $Gb_{128}(k)$, $Gu512(k)$, and $Gv512(k)$. The second Golay sequence may include at least one of $G^{(1)}a_{128}(k)$, $G^{(1)}b_{128}(k)$, $G^{(1)}u512$, and $G^{(1)}v512(k)$. Here, the second seed may be determined in consideration of the correlation between a Golay sequence to be generated based on the second seed and a Golay sequence to be generated based on the first seed.

The transmission apparatus 100 generates a first reference signal including the first Golay sequence and a second reference signal including the second Golay sequence in operation 2403. For example, the transmission apparatus 100 generates a first CEF 800 as illustrated in FIGS. 8A and 8B based on the first Golay sequence obtained based on the first seed, and generates a first reference signal including the generated first CEF. The first CEF 800 may sequentially include −Ga128, Gu512, Gv512, and −Gb128. Here, Gu512 may sequentially include −Gb128, −Ga128, Gb128, and −Ga128, and Gv512 may sequentially include −Gb128, Ga128, −Gb128, −Ga128. The transmission apparatus 100 also generates a second CEF 810 as illustrated in FIG. 8A or a second CEF 820 as illustrated in FIG. 8B based on the second Golay sequence obtained based on the second seed, and generate a second reference signal including the second CEF. The second CEF 810 may sequentially include −Ga128, $G^{(1)}u512$, $G^{(1)}v512$, and $−G^{(1)}b128$. Further, the second CEF 820 may sequentially include $−G^{(1)}a128$, $G^{(1)}u512$, $G^{(1)}v512$, and $−G^{(1)}b128$. Here, $G^{(1)}u512$ may sequentially include $−G^{(1)}b128$, $−G^{(1)}a128$, $G^{(1)}b128$, and $−G^{(1)}a128$, and $G^{(1)}v512$ may sequentially include $−G^{(1)}b128$, $G^{(1)}a128$, $−G^{(1)}b128$, and $−G^{(1)}a128$.

The transmission apparatus 100 transmits the first reference signal and the second reference signal through a first antenna and a second antenna, respectively, in operation 2405. For example, as illustrated in FIG. 9, the transmission apparatus 100 transmits the first reference signal including the first CEF 800 using the first antenna and transmits the second reference signal including the second CEF 810 using the second antenna.

Subsequently, the transmission apparatus 100 terminates the operation procedure according to the exemplary embodiment of the present disclosure.

The exemplary embodiment of the present disclosure shows that different Golay sequences are generated using different seeds. However, using different seeds is merely an example and does not limit the present disclosure. For example, the transmission apparatus 100 may generate different Golay sequences using different methods. In another example, the transmission apparatus 100 may use different Golay sequences stored in advance in a memory.

Figure 25:
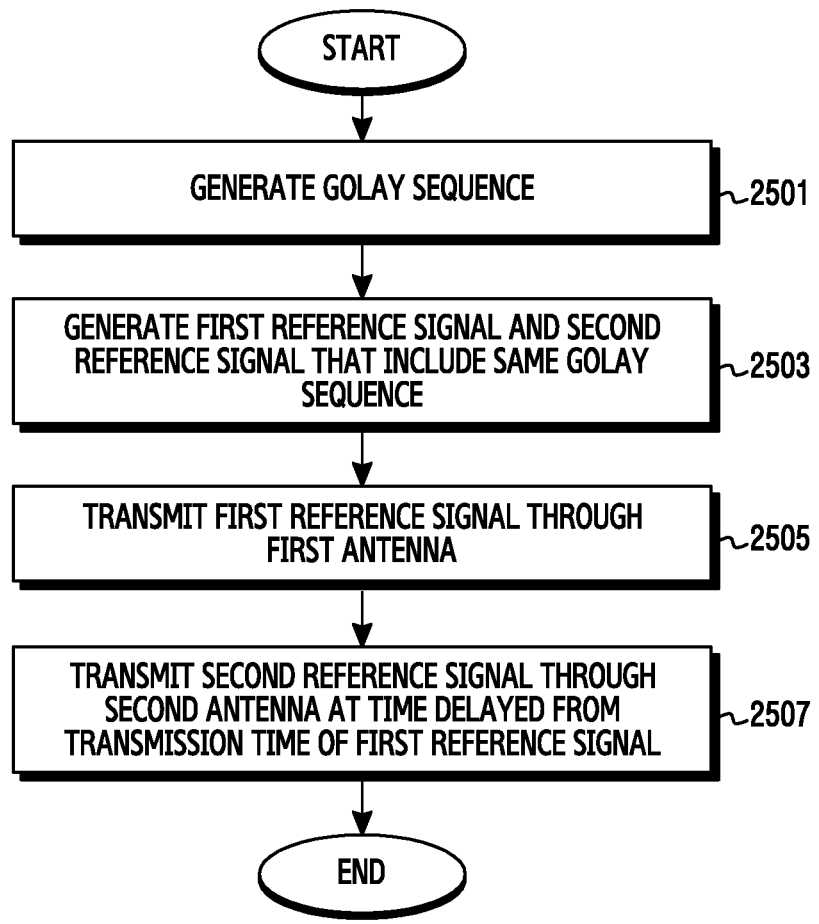
FIG. 25 illustrates the operation procedure of a transmission apparatus according to another exemplary embodiment of the present disclosure.

FIG. 25 illustrates the operation procedure of a transmission apparatus according to another exemplary embodiment of the present disclosure. Here, for convenience of explanation, it is assumed that a 2×2 MIMO system is supported. However, the following operation may be applied to an N×N MIMO system in the same manner. In addition, the order of the operations described below is provided only for illustration and does not limit the present disclosure. For example, the order of operations described below may be changed depending on the design.

Referring to FIG. 25, the transmission apparatus 100 generates a Golay sequence in operation 2501. For example, the transmission apparatus 100 may generate the Golay sequence based on one seed. More specifically, the transmission apparatus 100 may generate the first Golay sequence by applying Dn and $W_n$ represented by Equation 2 to Equation 1 using $D_n$ and $W_n$ as seeds. Here, the first Golay sequence may include at least one of $Ga_{128}(k)$, $Gb_{128}(k)$, $Gu512(k)$, and $Gv512(k)$.

The transmission apparatus 100 generates a first reference signal and a second reference signal that include the same Golay sequence in operation 2503. For example, the transmission apparatus 100 generates a first CEF 1400 and a second CEF 1410 as illustrated in FIG. 14 based on the first Golay sequence obtained based on the first seed. Here, the first CEF 1400 and the second CEF 1410 may sequentially include −Ga128, Gu512, Gv512, and −Gb128. Here, Gu512 may sequentially include −Gb128, −Ga128, Gb128, and −Ga128, and Gv512 may sequentially include −Gb128, Ga128, −Gb128, and −Ga128. The transmission apparatus 100 generates the first reference signal including the first CEF 1400 and the second reference signal including the second CEF 1410.

The transmission apparatus 100 transmits the first reference signal through a first antenna in operation 2505. For example, the transmission apparatus 100 transmits the first reference signal including the first CEF 1400 illustrated in FIG. 15 to a reception apparatus 102 at a first time through the first antenna.

The transmission apparatus 100 transmits the second reference signal through a second antenna at a time delayed from the transmission time of the first reference signal in operation 2507. For example, the transmission apparatus 100 transmits the second reference signal including the second CEF 1410 illustrated in FIG. 15 to the reception apparatus 102 at a second time through the second antenna. Here, the second time is a time after a predetermined time from the first time.

Subsequently, the transmission apparatus 100 terminates the operation procedure according to the exemplary embodiment of the present disclosure.

Figure 26:
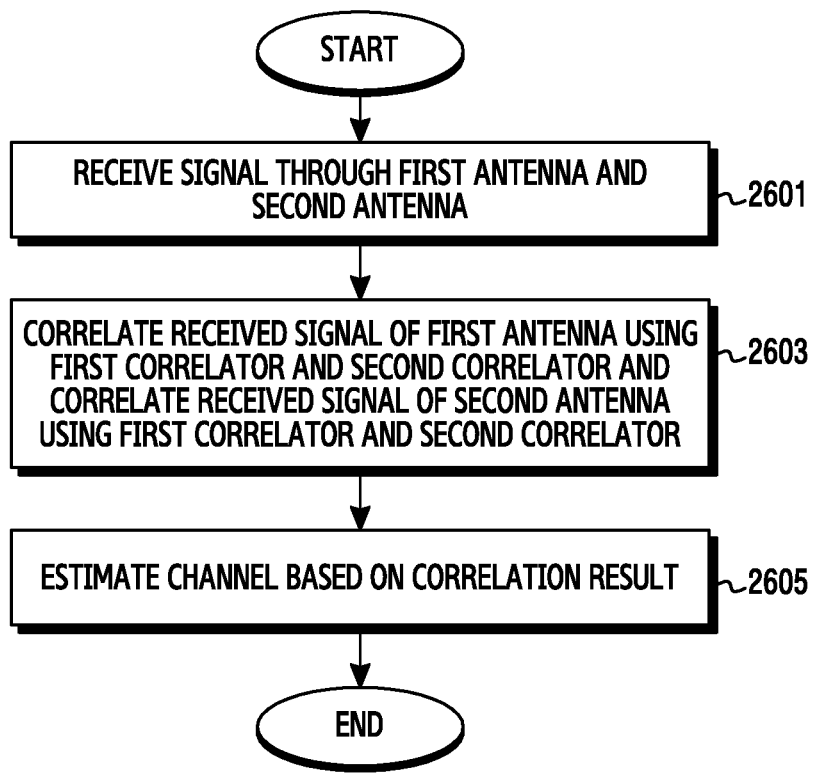
FIG. 26 illustrates the operation procedure of a reception apparatus according to an exemplary embodiment of the present disclosure.

FIG. 26 illustrates the operation procedure of a reception apparatus according to an exemplary embodiment of the present disclosure. Here, for convenience of explanation, it is assumed that a 2×2 MIMO system is supported. However, the following operation may be applied to an N×N MIMO system in the same manner. In addition, the order of the operations described below is provided only for illustration and does not limit the present disclosure. For example, the order of operations described below may be changed depending on the design.

Referring to FIG. 26, the reception apparatus 102 receives a signal through a first antenna and a second antenna in operation 2601. For example, the reception apparatus 102 may receive a reference signal transmitted from a first antenna and a second antenna of a transmission apparatus 100 through the first antenna, and may receive a reference signal transmitted from the first antenna and the second antenna of the transmission apparatus 100 through the second antenna.

The reception apparatus 102 correlates the received signal of the first antenna using a first correlator and a second correlator and correlates the received signal of the second antenna using the first correlator and the second correlator in operation 2603. Here, the first correlator and the second correlator may be configured based on a Golay sequence generated by the transmission apparatus 100. For example, when the transmission apparatus 100 generates a first reference signal is generated based on Gu512 and Gv512 and generates a second reference signal based on $G^{(1)}$u512 and $G^{(1)}$v512, the first correlator may be configured based on Gu512 and Gv512, and the second correlator may be configured based on $G^{(1)}$u512 and $G^{(1)}$v512.

In operation 2605, the reception apparatus 102 estimates a channel based on the result of the correlation in operation 2603. For example, the reception apparatus 102 may add the signals resulting from the correlation, thereby estimating the channel based on the characteristic that interference components become impulse signals.

Subsequently, the reception apparatus 102 terminates the operation procedure according to the exemplary embodiment of the present disclosure.

Figure 27:
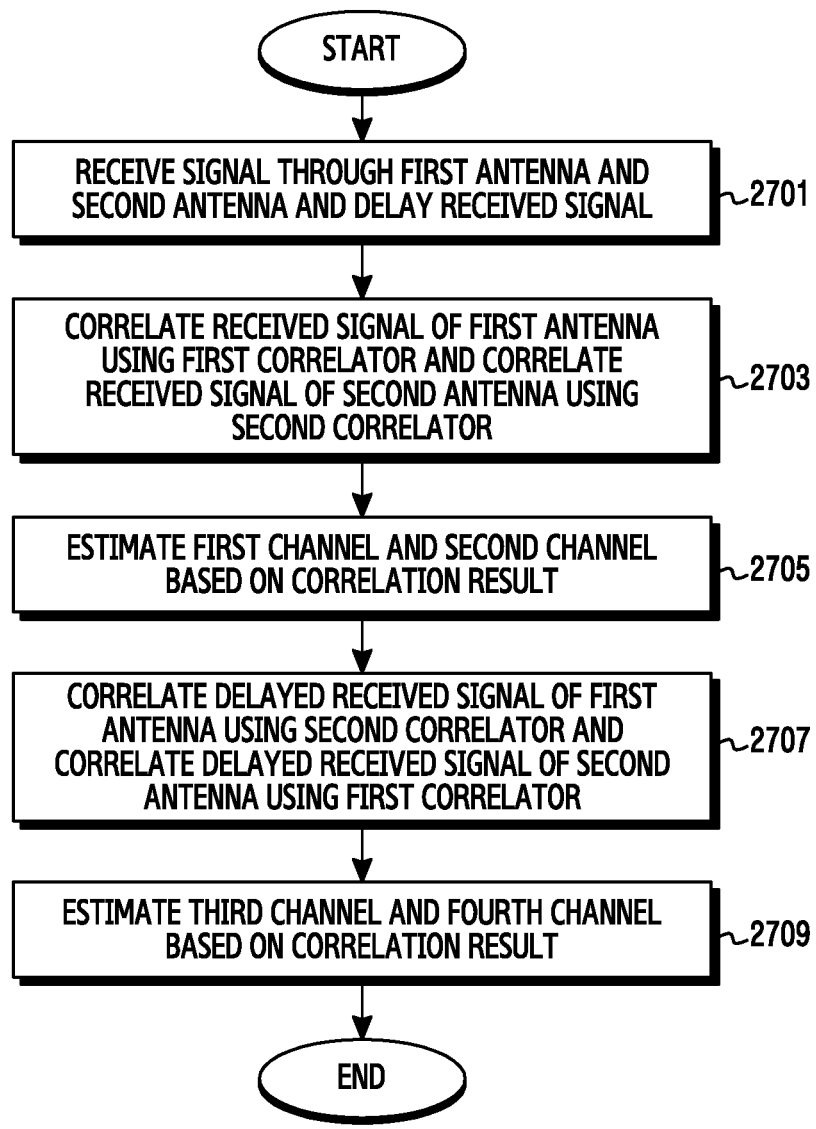
FIG. 27 illustrates the operation procedure of a reception apparatus according to another exemplary embodiment of the present disclosure.

FIG. 27 illustrates the operation procedure of a reception apparatus according to another exemplary embodiment of the present disclosure. Here, for convenience of explanation, it is assumed that a 2×2 MIMO system is supported. However, the following operation may be applied to an N×N MIMO system in the same manner. In addition, the order of the operations described below is provided only for illustration and does not limit the present disclosure. For example, the order of operations described below may be changed depending on the design. FIG. 27 assumes that each antenna employs a single correlator in the reception apparatus 102.

Referring to FIG. 27, the reception apparatus 102 receives a signal through a first antenna and a second antenna and delays the received signal in operation 2701. For example, the reception apparatus 102 may receive a reference signal transmitted from a first antenna and a second antenna of a transmission apparatus 100 through the first antenna, and may receive a reference signal transmitted from the first antenna and the second antenna of the transmission apparatus 100 through the second antenna. The reception apparatus 102 may temporarily store or delay the received signal of the first antenna and the received signal of the second antenna using a buffer or a delayer.

The reception apparatus 102 correlates the received signal of the first antenna using a first correlator and correlates the received signal of the second antenna using a second correlator in operation 2703. Here, the first correlator and the second correlator may be configured based on a Golay sequence generated by the transmission apparatus 100. For example, when the transmission apparatus 100 generates a first reference signal is generated based on Gu512 and Gv512 and generates a second reference signal based on $G^{(1)}$u512 and $G^{(1)}$v512, the first correlator may be configured based on Gu512 and Gv512, and the second correlator may be configured based on $G^{(1)}$u512 and $G^{(1)}$v512.

In operation 2705, the reception apparatus 102 estimates a first channel and a second channel based on the result of the correlation in operation 2703. For example, the reception apparatus 102 may add the results of the correlation, thereby estimating the channel based on the characteristic that interference components become impulse signals. Specifically, as illustrated in FIG. 13, the reception apparatus 102 provides signals received from time $t_0$ to time $t_1$ to the first and second Golay correlators 103-1 and 130-2, thereby obtaining Ru, $Ru^{(1)}$, Rv, and $Rv^{(1)}$. The reception apparatus 102 may add obtained Ru, $Ru^{(1)}$, Rv, and $Rv^{(1)}$, thereby estimating channels $h_11$ and $h_22$.

In operation 2707, the reception apparatus 102 correlates the delayed received signal of the first antenna using the second correlator and correlates the delayed received signal of the second antenna using the first correlator. In operation 1209, the reception apparatus 102 estimates a third channel and a fourth channel based on the result of the correlation in operation 2707. For example, the reception apparatus 102 may add the results of correlating the delayed or buffered signals, thereby estimating the channels based on the characteristic that interference components become impulse signals. Specifically, as illustrated in FIG. 13, the reception apparatus 102 provides signals received from time $t_2$ to time $t_3$ to the first and second Golay correlators 103-1 and 130-2, thereby obtaining $R_u$, $R_u^{(1)}$, $R_v$, and $R_v^{(1)}$. The reception apparatus 102 may add obtained $R_u$, $R_u^{(1)}$, $R_v$, and $R_v^{(1)}$, thereby estimating channels $h_{12}$ and $h_{21}$.

Subsequently, the reception apparatus 102 terminates the operation procedure according to the exemplary embodiment of the present disclosure.

Figure 28:
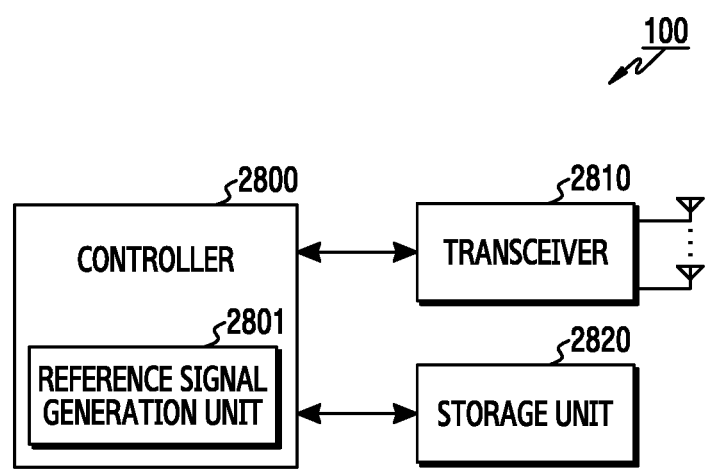
FIG. 28 is a block diagram illustrating the configuration of a transmission apparatus according to an exemplary embodiment of the present disclosure.

FIG. 28 is a block diagram illustrating the configuration of a transmission apparatus according to an exemplary embodiment of the present disclosure.

Referring to FIG. 28, the transmission apparatus 100 may include a controller 2800, a transceiver 2810, and a storage unit 2820, wherein the controller 2800 may include a reference signal generation unit 2801.

The controller 2800 may include at least one processor. The controller 2800 controls a function for the overall operation of the transmission apparatus. The controller 2800 includes the reference signal generation unit 2801. The reference signal generation unit 2801 may generate and transmit a reference signal for minimizing a channel estimation error based on a Golay sequence. Although not shown, the reference signal generation unit 2801 may include a Golay sequence generator 101 to generate a Golay sequence based on a recursive procedure represented by Equation 1. The reference signal generation unit 2801 may generate a CEF including a Golay sequence and may generate a reference signal including the generated CEF. The reference signal may include information for channel estimation and synchronization for a reception apparatus 102. The reference signal generation unit 2801 may generate the CEF by various methods depending on the design method. For example, the reference signal generation unit 2801 may generate a first CEF and a second CEF based on two different seeds as illustrated in FIGS. 8A and 8B. In another example, the reference signal generation unit 2801 may generate a first CEF and a second CEF based on a single seed as illustrated in FIG. 14. Here, the reference signal generation unit 2801 may control the first CEF and the second CEF to be transmitted at different times. Further, the reference signal generation unit 2801 may generate first to fourth CEFs based on two different seeds as illustrated in FIGS. 17A and 17B. Further, the reference signal generation unit 2801 may generate first to fourth CEFs based on two different seeds as illustrated in FIGS. 20A and 20B. Here, as illustrated in FIGS. 20A and 20B, the reference signal generation unit 2801 may control a transmission time for third and fourth CEFs to be delayed by a certain time or longer from a transmission time for first and second CEFs.

The transceiver 2810 includes a plurality of antennas. The plurality of antennas may be an array antenna. The transceiver 2810 transmits a signal to the reception apparatus 102 using the plurality of antennas. The transceiver 2810 may transmit a plurality of reference signals to the reception apparatus 102 using the plurality of antennas under the control of the controller 2800.

The storage unit 2820 stores various data and programs necessary for the operation of the transmission apparatus 100. The storage unit 2820 may store information on a seed necessary to generate a reference signal. For example, the storage unit 2820 may store $D_n$ and $W_n$ represented by Equation 2 and may store $D_n$ and $W_n$ represented by Equation 9.

Although FIG. 28 illustrates that the controller 2800 includes the reference signal generation unit 2801, the reference signal generation unit 2801 may be included in the transceiver 2810 depending on the design method.

Figure 29:
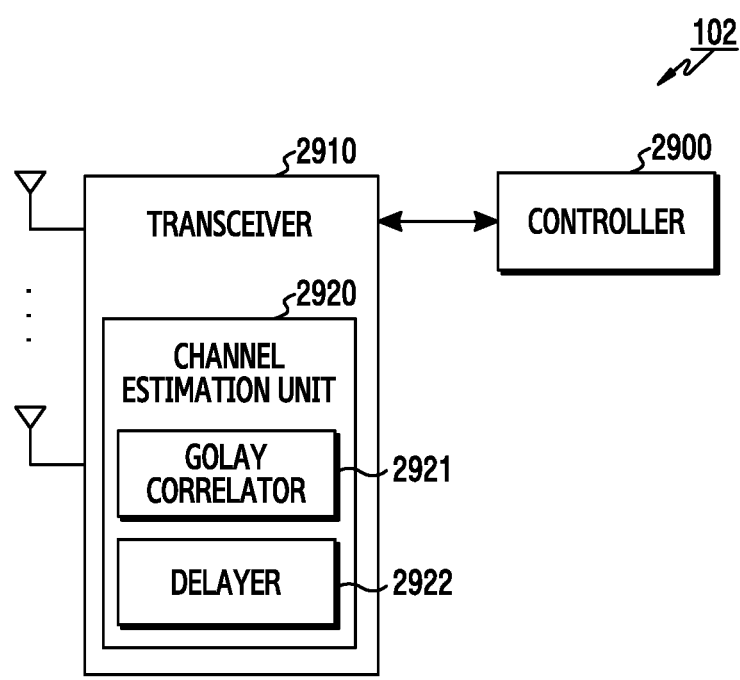
FIG. 29 is a block diagram illustrating the configuration of a reception apparatus according to an exemplary embodiment of the present disclosure.

FIG. 29 is a block diagram illustrating the configuration of a reception apparatus according to an exemplary embodiment of the present disclosure.

Referring to FIG. 29, the reception apparatus 102 may include a controller 2900 and a transceiver 2910, wherein the transceiver 2910 may include a channel estimation unit 2920.

The controller 2900 may include at least one processor. The controller 2900 controls a function for the overall operation of the reception apparatus. The controller 2900 may control the transceiver 2910 to control an operation for estimating a channel from a reference signal.

The transceiver 2910 may include a plurality of antennas. Here, the plurality of antennas may be an array antenna. The transceiver 2910 receives a signal transmitted from a transmission apparatus 100 using the plurality of antennas. In particular, the transceiver 2910 may include the channel estimation unit 2920. The channel estimation unit 2920 performs an operation for estimating a channel between the transmission apparatus 100 and the reception apparatus 102 from a reference signal received from the plurality of antennas. Specifically, the channel estimation unit 2920 may include a Golay correlator 2921 and a delayer 2922. The channel estimation unit 2920 may include one Golay correlator 2921 for each receiving antenna or may include a plurality of Golay correlators for each receiving antenna. Further, the channel estimation unit 2920 may include one or more delayers 2922 for each receiving antenna. Here, the Golay correlator 2921 may be configured based on a Golay sequence generation method of the transmission apparatus 100. Therefore, a method for generating and transmitting a reference signal based on a Golay sequence may be preconfigured in each of the transmission apparatus 100 and the reception apparatus 102 or may be agreed upon between the transmission apparatus 100 and the reception apparatus 102 through the exchange of signals therebetween. The channel estimation unit 2920 may correlate the signals received through the plurality of antennas using the Golay correlator 2921 and the delayer 2922 by the method illustrated in FIG. 13, FIG. 18, or FIG. 23 and may estimate a channel based on the correlation result. The channel estimation unit 2920 may add particular correlation results, so that interference components become 0 in each channel during a channel measurement interval. Accordingly, the channel estimation unit 2920 may estimate each channel without any error.

According to an exemplary embodiment of the present disclosure, for channel estimation in an MIMO system, different Golay sequences may be transmitted through separate antennas or the same Golay sequence may be transmitted through each antenna at different times, thereby preventing the occurrence of a channel estimation error.

Although the present disclosure has been described by the restricted embodiments and the drawings as described above, the present disclosure is not limited to the aforementioned embodiments and various modifications and alterations can be made from the descriptions by those skilled in the art to which the present disclosure pertains.

Operations according to an embodiment of the present disclosure may be implemented by a single controller. In this case, program instructions for performing various computer-implemented operations may be stored in a computer-readable medium. The computer readable medium may include a program command, a data file, a data structure, and the like independently or in combination. The program command may be things specially designed and configured for the present disclosure, or things that are well known to and can be used by those skilled in the related art. For example, the computer readable recoding medium includes magnetic media such as a hard disk, a floppy disk, and a magnetic tape, optical media such as a CD-ROM and a DVD, magneto-optical media such as a floptical disk, and hardware devices such as a ROM, RAM, and a flash memory, which are specially constructed in such a manner that they can store and execute a program command. Examples of the program command include a machine language code generated by a compiler and a high-level language code executable by a computer through an interpreter and the like. When all or some of the base stations or relays as described in the present disclosure are implemented by a computer program, a computer-readable recording medium in which the computer program is stored also falls within the scope of the present disclosure. Therefore, the scope of the present disclosure should not be defined as being limited to the embodiments, but should be defined by the appended claims and equivalents thereof.

What is claimed is:

1. A method performed by a transmission apparatus in a wireless communication system, the method comprising:
    generating first golay sequences based on a first seed and a common seed;
    generating second golay sequences based on a second seed and the common seed;
    generating a first channel estimation field (CEF) based on the first golay sequences, wherein:
        the first CEF comprises −Ga128, Gu512, Gv512, and −Gb128,
        the Gu512 sequentially comprises −Gb128, −Ga128, Gb128, and −Ga128, and
        the Gv512 sequentially comprises −Gb128, Ga128, −Gb128, and −Ga128; and
    generating a second CEF based on the second golay sequences, wherein:
        the second CEF sequentially comprises −Ga$^{(1)}$128, G$^{(1)}$u512, G$^{(1)}$v512, and −G$^{(1)}$b128,
        the G$^{(1)}$u512 sequentially comprises −Gb$^{(1)}$128, −Ga$^{(1)}$128, Gb$^{(1)}$128, and −Ga$^{(1)}$128, and
        the G$^{(1)}$v512 sequentially comprises −Gb$^{(1)}$128, Ga$^{(1)}$128, −Gb$^{(1)}$128, and −Ga$^{(1)}$128,
    wherein the first golay sequences comprises the Ga128 and the Gb128,
    wherein the second golay sequences comprises the Ga$^{(1)}$128 and the Gb$^{(1)}$128,
    wherein the common seed comprises a vector $D_n$=[1 8 2 4 16 32 64], and
    wherein the first seed comprises a first vector $W_n$=[−1, −1, −1, −1, +1, −1 −1] for a first antenna and the second seed comprises a second vector $W_n$=[+1, −1, −1, −1, +1, −1 −1] for a second antenna.

2. The method of claim 1,
    wherein the first CEF is used for a transmission associated with the first antenna of the transmission apparatus, and wherein the second CEF is used for a transmission associated with the second antenna of the transmission apparatus.

3. The method of claim 1,
wherein the first golay sequences comprises $Ga128(k)=A_7(128-k)$ and $Gb128(k)=B_7(128-k)$,
wherein each of the $A_7(128-k)$ and the $B_7(128-k)$ is determined according to the following equations:

$$A_0(k)=\delta(k);$$

$$B_0(k)=\delta(k);$$

$$A_n(k)=W_n A_{n-1}(k)+B_{n-1}(k-D_n); \text{ and}$$

$$B_n(k)=W_n A_{n-1}(k)-B_{n-1}(k-D_n), \text{ and}$$

wherein, n=1, 2, ..., N, represents a number of iterations, and k=0, 1, ..., $2^N-1$, $A_n(k)$ and $B_n(k)$ are 0 where k<0, k≥2n, $\delta(k)$ represents a delta function, $D_n$ represents the common seed, and $W_n$ represents the first seed.

4. The method of claim 1, wherein a correlation between a sequence obtained from the first golay sequences and a sequence obtained from the second golay sequences is zero.

5. The method of claim 1, wherein a transmission start time for the second CEF is delayed by a predetermined time from a transmission start time for the first CEF.

6. A method performed by a reception apparatus in a wireless communication system, the method comprising:
identifying first golay sequences generated based on a first seed and a common seed;
identifying second golay sequences generated based on a second seed and the common seed; and
obtaining a first channel estimation field (CEF) based on the first golay sequences and a second CEF based on the second golay sequences,
wherein:
the first CEF comprises −Ga128, Gu512, Gv512, and −Gb128,
the Gu512 sequentially comprises −Gb128, −Ga128, Gb128, and −Ga128, and
the Gv512 sequentially comprises −Gb128, Ga128, −Gb128, and −Ga128,
wherein:
the second CEF sequentially comprises −Ga$^{(1)}$128, G$^{(1)}$u512, G$^{(1)}$v512, and −G$^{(1)}$b128,
the G$^{(1)}$u512 sequentially comprises −Gb$^{(1)}$128, −Ga$^{(1)}$128, Gb$^{(1)}$128, and −Ga$^{(1)}$128, and
the G$^{(1)}$v512 sequentially comprises −Gb$^{(1)}$128, Ga$^{(1)}$128, −Gb$^{(1)}$128, and −Ga$^{(1)}$128,
wherein the first golay sequences comprises the Ga128 and the Gb128,
wherein the second golay sequences comprises the Ga$^{(1)}$128 and the Gb$^{(1)}$128,
wherein the common seed comprises a vector $D_n$=[1 8 2 4 16 32 64], and
wherein the first seed comprises a first vector $W_n$=[−1, −1, −1, −1, +1, −1 −1] for a first antenna of a transmission apparatus and the second seed comprises a second vector $W_n$=[+1, −1, −1, −1, +1, −1 −1] for a second antenna of the transmission apparatus.

7. The method of claim 6,
wherein the first CEF is used for a transmission associated with the first antenna of the transmission apparatus, and
wherein the second CEF is used for a transmission associated with the second antenna of the transmission apparatus.

8. The method of claim 6,
wherein the first golay sequences comprises $Ga128(k)=A_7(128-k)$ and $Gb128(k)=B_7(128-k)$,
wherein each of the $A_7(128-k)$ and the $B_7(128-k)$ is determined following equations:

$$A_0(k)=\delta(k);$$

$$B_0(k)=\delta(k);$$

$$A_n(k)=W_n A_{n-1}(k)+B_{n-1}(k-D_n); \text{ and}$$

$$B_n(k)=W_n A_{n-1}(k)-B_{n-1}(k-D_n), \text{ and}$$

wherein, n=1, 2, ..., N, represents a number of iterations, and k=0, 1, ..., $2^N-1$, $A_n(k)$ and $B_n(k)$ are 0 where k<0, k≥2n, $\delta(k)$ represents a delta function, $D_n$ represents the common seed, and $W_n$ represents the first seed.

9. The method of claim 6, wherein a correlation between a sequence obtained from the first golay sequences and a sequence obtained from the second golay sequences is zero.

10. The method of claim 6, wherein the obtaining the first CEF and the second CEF comprises:
performing first correlation of a received signal of the first antenna by using a first correlator, and
performing second correlation of the received signal of the second antenna by using a second correlator, and
wherein the first correlator is configured based on the first golay sequences, and the second correlator is configured based on the second golay sequences.

11. A transmission apparatus in a wireless communication system, the transmission apparatus comprising:
at least one transceiver; and
at least one processor coupled to the at least one transceiver, configured to:
generate first golay sequences based on a first seed and a common seed;
generate second golay sequences based on a second seed and the common seed;
generate a first channel estimation field (CEF) based on the first golay sequences, wherein:
the first CEF comprises −Ga128, Gu512, Gv512, and −Gb128,
the Gu512 sequentially comprises −Gb128, −Ga128, Gb128, and −Ga128, and
the Gv512 sequentially comprises −Gb128, Ga128, −Gb128, and −Ga128; and
generate a second CEF based on the second golay sequences, wherein:
the second CEF sequentially comprises −Ga$^{(1)}$128, G$^{(1)}$u512, G$^{(1)}$v512, and −G$^{(1)}$b128,
the G$^{(1)}$u512 sequentially comprises −Gb$^{(1)}$128, −Ga$^{(1)}$128, Gb$^{(1)}$128, and −Ga$^{(1)}$128, and
the G$^{(1)}$v512 sequentially comprises −Gb$^{(1)}$128, Ga$^{(1)}$128, −Gb$^{(1)}$128, and −Ga$^{(1)}$128,
wherein the first golay sequences comprises the Ga128 and the Gb128,
wherein the second golay sequences comprises the Ga$^{(1)}$128 and the Gb$^{(1)}$128,
wherein the common seed comprises a vector $D_n$=[1 8 2 4 16 32 64], and
wherein the first seed comprises a first vector $W_n$=[−1, −1, −1, −1, +1, −1 −1] for a first antenna and the second seed comprises a second vector $W_n$=[+1, −1, −1, −1, +1, −1 −1] for a second antenna.

12. The transmission apparatus of claim 11,
wherein the first CEF is used for a transmission associated with the first antenna of the transmission apparatus, and wherein the second CEF is used for a transmission associated with the second antenna of the transmission apparatus.

13. The transmission apparatus of claim 11,
wherein the first golay sequences comprises Ga128(k)=$A_7$(128−k) and Gb128(k)=$B_7$(128−k),
wherein each of the $A_7$(128−k) and the $B_7$(128−k) is determined following equations:

$A_0(k)=\delta(k)$;

$B_0(k)=\delta(k)$;

$A_n(k)=W_n A_{n-1}(k)+B_{n-1}(k-D_n)$; and $B_n(k)=W_n A_{n-1}(k)-B_{n-1}(k-D_n)$, and wherein, n=1, 2, ..., N, represents a number of iterations, and k=0, 1, ..., $2^N-1$, $A_n(k)$ and $B_n(k)$ are 0 where k<0, k≥2n, $\delta(k)$ represents a delta function, $D_n$ represents the common seed, and $W_n$ represents the first seed.

14. The transmission apparatus of claim 11, wherein a correlation between a sequence obtained from the first golay sequences and a sequence obtained from the second golay sequences is zero.

15. The transmission apparatus of claim 11, wherein a transmission start time for the second CEF is delayed by a predetermined time from a transmission start time for the first CEF.

16. A reception apparatus in a wireless communication system, the reception apparatus comprising:
at least one transceiver; and
at least one processor coupled to the at least one transceiver, configured to:
identify first golay sequences generated based on a first seed and a common seed;
identify second golay sequences generated based on a second seed and the common seed; and
obtain a first channel estimation field (CEF) based on the first golay sequences and a second CEF based on the second golay sequences,
wherein:
the first CEF comprises −Ga128, Gu512, Gv512, and −Gb128,
the Gu512 sequentially comprises −Gb128, −Ga128, Gb128, and −Ga128, and
the Gv512 sequentially comprises −Gb128, Ga128, −Gb128, and −Ga128,
wherein:
the second CEF sequentially comprises −$Ga^{(1)}$128, $G^{(1)}u$512, $G^{(1)}v$512, and −$G^{(1)}b$128,
the $G^{(1)}u$512 sequentially comprises −$Gb^{(1)}$128, −$Ga^{(1)}$128, $Gb^{(1)}$128, and −$Ga^{(1)}$128, and
the $G^{(1)}v$512 sequentially comprises −$Gb^{(1)}$128, $Ga^{(1)}$128, −$Gb^{(1)}$128, and −$Ga^{(1)}$128,
wherein the first golay sequences comprises the Ga128 and the Gb128,
wherein the second golay sequences comprises the $Ga^{(1)}$128 and the $Gb^{(1)}$128,
wherein the common seed comprises a vector $D_n$=[1 8 2 4 16 32 64], and
wherein the first seed comprises a first vector $W_n$=[−1, −1, −1, −1, +1, −1 −1] for a first antenna of a transmission apparatus and the second seed comprises a second vector $W_n$=[+1, −1, −1, −1, +1, −1 −1] for a second antenna of the transmission apparatus.

17. The reception apparatus of claim 16,
wherein the first CEF is used for a transmission associated with the first antenna of the transmission apparatus, and
wherein the second CEF is used for a transmission associated with the second antenna of the transmission apparatus.

18. The reception apparatus of claim 16,
wherein the first golay sequences comprises Ga128(k)=$A_7$(128−k) and Gb128(k)=$B_7$(128−k),
wherein each of the $A_7$(128−k) and the $B_7$(128−k) is determined according to the following equations:

$A_0(k)=\delta(k)$;

$B_0(k)=\delta(k)$;

$A_n(k)=W_n A_{n-1}(k)+B_{n-1}(k-D_n)$; and $B_n(k)=W_n A_{n-1}(k)-B_{n-1}(k-D_n)$, and wherein, n=1, 2, ..., N, represents a number of iterations, and k=0, 1, ..., $2^N-1$, $A_n(k)$ and $B_n(k)$ are 0 where k<0, k≥2n, $\delta(k)$ represents a delta function, $D_n$ represents the common seed, and $W_n$ represents the first seed.

19. The reception apparatus of claim 16, wherein a correlation between a sequence obtained from the first golay sequences and a sequence obtained from the second golay sequences is zero.

20. The reception apparatus of claim 16, wherein, to obtain the first CEF and the second CEF, the at least one processor is configured to:
perform first correlation of a received signal of the first antenna by using a first correlator, and
perform second correlation of the received signal of the second antenna by using a second correlator, and
wherein the first correlator is configured based on the first golay sequences, and the second correlator is configured based on the second golay sequences.

* * * * *